United States Patent
Toksoz et al.

(10) Patent No.: US 11,036,526 B2
(45) Date of Patent: Jun. 15, 2021

(54) AUTOMATICALLY SELECTING AND DISTRIBUTING RECORDINGS OF APPLICATIONS EXECUTING ON COMPUTING DEVICES OVER NETWORKED ENVIRONMENTS

(71) Applicant: Google LLC, Mountain View, CA (US)

(72) Inventors: Tuna Toksoz, Mountain View, CA (US); Pasha Nahass, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/737,264

(22) PCT Filed: Dec. 5, 2016

(86) PCT No.: PCT/US2016/065026
§ 371 (c)(1),
(2) Date: Dec. 15, 2017

(87) PCT Pub. No.: WO2018/106214
PCT Pub. Date: Jun. 14, 2018

(65) Prior Publication Data
US 2019/0286461 A1    Sep. 19, 2019

(51) Int. Cl.
*G06F 11/34* (2006.01)
*G06F 9/451* (2018.01)
*G06F 8/60* (2018.01)

(52) U.S. Cl.
CPC .......... *G06F 9/453* (2018.02); *G06F 11/3414* (2013.01); *G06F 11/3438* (2013.01);
(Continued)

(58) Field of Classification Search
CPC .. G06F 9/453; G06F 11/3414; G06F 11/3438; G06F 11/3447
See application file for complete search history.

(56) References Cited

U.S. PATENT DOCUMENTS

2016/0044115 A1* 2/2016 Hill ................... H04L 65/602
709/227
2017/0311035 A1* 10/2017 Lewis ................ G06F 16/735

FOREIGN PATENT DOCUMENTS

EP        1 612 677 A2    1/2006
WO    WO-03/075178 A2    9/2003
WO    WO-2007/113573 A2  10/2007

OTHER PUBLICATIONS

Xiaofei Liao and Hai Jin, a New Cluster-Based Distributed Video Record Server, IEEE, 2003, retrieved online on Feb. 8, 2021, pp. 249-252. Retrieved from the Internet: <URL: https://ieeexplore.ieee.org/stamp/stamp.jsp?tp=&arnumber=1221295>. (Year: 2003).*

(Continued)

*Primary Examiner* — Hanh Thi-Minh Bui
(74) *Attorney, Agent, or Firm* — Foley & Lardner LLP

(57) ABSTRACT

Systems and methods for are automatically generating tutorials for applications provided herein. The server can receive, from a first client device, a first request. The server can transmit, to the first client device, an application and a recorder script to record execution of the application running on the first client device. The server can receive the recording of the application. The server can receive, from a second client device, a second request. The server can transmit, to the second client device, the application and an interaction measurement script to generate an interaction log of interactions with the application. The server can receive the log of interactions. The server can receive, from a third client device, a third request. The server can select the recording of the application based on a performance metrics for the record. The server can transmit the application with the selected recording of the application.

19 Claims, 6 Drawing Sheets

(52) U.S. Cl.
CPC ............ *G06F 11/3447* (2013.01); *G06F 8/60* (2013.01); *G06F 2201/86* (2013.01); *Y02D 10/00* (2018.01)

(56) References Cited

OTHER PUBLICATIONS

Decision to Grant for EP Appln. Ser. No. 16819391.0 dated May 9, 2019 (2 pages).
European Search Report on EP Appln. Ser. No. 16819391.0 dated Jul. 16, 2019 (6 pages).
International Preliminary Report on Patentability on Appln. Ser. No. PCT/US2016/065026 dated Jun. 20, 2019 (8 pages).
Notification of Transmittal of the International Search Report and the Written Opinion of the International Searching Authority, PCT/US 2016065026, dated Aug. 8, 2017.
First Office Action for CN Appln. Ser. No. 201680040914.8 dated Dec. 7, 2020 (13 pages).
Examination Report for EP Appln. Ser. No. 19174779.9 dated Jan. 20, 2021 (5 pages).
Second Office Action for CN Appln. Ser. No. 201680040914.8 dated Apr. 7, 2021 (9 pages).

\* cited by examiner

AUTOMATICALLY SELECTING AND DISTRIBUTING RECORDINGS OF APPLICATIONS EXECUTING ON COMPUTING DEVICES OVER NETWORKED ENVIRONMENTS

CROSS-REFERENCES TO RELATED APPLICATIONS

The present application is a National Stage application under 35 U.S.C. § 371 of International Patent Application No. PCT/US2016/065026, titled "AUTOMATICALLY SELECTING AND DISTRIBUTING RECORDINGS OF APPLICATIONS EXECUTING ON COMPUTING DEVICES OVER NETWORKED ENVIRONMENTS," filed Dec. 5, 2016, which is incorporated herein by reference in its entirety.

BACKGROUND

In a computer networked environment, such as the Internet, an application may be downloaded by a client device from a server. Upon execution of the application, an end user at the client device may interact with the application displayed on the client device.

SUMMARY

Many end users may find it difficult to operate and use a computer program installed for the first time. Certain end users might take a prolonged amount of time looking for particular interface elements. Other end users might never find special features of the computer program due to lack of knowledge or awareness. This difficulty in operating the computer program may result in frustration on the part of the end user, leading to the degradation of human-computer interaction (HCI) between the end user and the computer program and in turn resulting in higher power consumption, network bandwidth usage, and processor time arising from the increased time for the user to learn how to operate the computer program to perform a task. Software developers or publishers may create text or video tutorials to instruct end users on how to use and operate the computer program to mitigate some of these problems. These tutorials, however, may still be lacking specific details regarding the computer program relevant to the end user, because creators of such tutorials might not know a priori what end users are seeking from the computer program. Additionally, creating such tutorials can be time consuming and require technical expertise for understanding the computer program to generate an effective tutorial for a particular computer program. Where a large number of computer programs already exist without associated tutorials, creating tutorials for existing computer programs may be prohibitive. Thus, there remain technical challenges associated with generation of effective tutorials for computer programs.

To address these and other technical challenges, the present disclosure provides systems and methods of automatically generating tutorial videos for instructing end users on how to use the computer program. In overview, for the first N users who download an application, a server (e.g., a data processing system) can send an additional script to record a video of these first users operating the application on the respective client devices. The server can then send one of these recorded videos to the next users who download the application. The server can receive one or more recordings of the application executing on a first client device and provide the recording of the application executing on the first client device as a tutorial. To identify a subset of the best performing videos, the server can log the user interactions of this next group of users with the application. Interactions with the application may then be monitored and the recording of the application may subsequently be modified based upon the interaction with the application. Based on the user interactions received from the next users, the server may maintain a model to calculate a performance metric for each of the recorded videos. As the server logs more and more user interactions, the server can also iteratively adjust the model to recalculate the performance metrics. This process may be iteratively repeated until a subset of best performing videos are identified.

In some implementations, a server can receive a request to download an application from a client device. The server can identify a number of recorded videos for the application running on various client devices. If the number of recorded videos is below a predetermined number, the server can then transmit the application along with a video recording script. The video recording script may be configured to record, with user permission, a video of the application running on the client device, as the end user interacts with the application. After a predefined time period, the video record script may be configured to transmit the video of the application to the server. The server can repeatedly transmit the application with the video recording script and can accumulate recorded videos, until the number of recorded videos is greater than or equal to the predetermined number.

After accumulating a number of recorded videos, when receiving additional requests to download the application from another client device, the server can identify a number of times that the other client device has downloaded or installed the application. The number of times downloaded being null may indicate that the client device is associated with a first-time end user of the application. The server can then select on the recorded videos and can transmit the application along with an interaction measurement script to the client device. The interaction measurement script may be configured to play the transmitted, recorded video showing how another end user operated the application. The interaction measurements script may be also configured to log user interaction events with the application at the client device, subsequent to the playing of recorded video and transmit the logged user interaction events back to the server.

Using the logged user interaction events, the server can generate a performance metric for the corresponding recorded video. The performance metric may indicate or may correspond to how informative the recorded video may be. The server can also maintain a model (e.g., artificial neural network) with weights for each of the recorded videos and user interaction events as inputs to calculate the performance metrics for each of the recorded videos. As the server receives more logged user interaction events, the server can adjust the model accordingly to recalculate the performance metrics. The parameters of the model may eventually converge such that a subset of recorded videos are associated with the highest performance metrics.

When the server receives additional requests to download from another set of client devices, the server can select one of the recorded videos based on the performance metric from the model. The server can then transmit the selected recorded video and the application to the respective client device. The client device can play the selected recorded video to instruct the end user on how to use the application. By selecting and presenting the appropriate video for the application, the present disclosure may thus reduce the time of execution of an application by training the user to properly use and run the application, thereby saving client-side power consumption, network bandwidth, and computer processing time. Additionally, by optimizing selection of the recorded video, the server may discard low-performing videos, saving server-side storage space, and allowing other computing devices (e.g. edge caching servers, content redistribution systems, etc.) to cache and retransmit the selected video, reducing server bandwidth consumption.

In at least one aspect, the present disclosure is directed to a method of automatically selecting and distributing recordings of applications executing on end user computing devices. An application executing on a data processing system having one or more processors can receive, from a first client device, a first request to download an application. A recording aggregator executing on the data processing system can determine that a number of recordings of execution of the application is below a threshold, responsive to receiving the first request. The application distributor can transmit, responsive to the determination that the number of recordings is below the threshold, to the first client device, the application and a recorder script. Receipt of the recorder script can trigger the first client device to record execution of the application running on the first client device and to transmit the recording to the data processing system. The recording aggregator can receiver, from the first client device, the recording of the application executing on the first client device.

In some implementations, the application distributor can receive, from a second client device, a second request to download the application, subsequent to receiving the recording of the application from the first client device. In some implementations, the recording aggregator can determine that the number of recordings of execution of the application is greater than the threshold. In some implementations, the application distributor can transmit, responsive to the determination that the number of recordings of execution of the application is greater than the threshold, to the second client device, the recording of the application executing on the first client device.

In some implementations, transmitting the recording of the application executing on the first client device to the second client device may include transmitting an interaction measurement script. In some implementations, receipt of the interaction measurement script can trigger the second client device to play the recording of the application executing on the first client device. In some implementations, the receipt of the interaction measurement script can trigger the second client device to generate an interaction log of one or more interaction events with the application running on the second client device, subsequent to playing the recording. In some implementations, the receipt of the interaction measurement script can trigger the second client device to transmit the generated interaction log to the data processing system.

In some implementations, a video selector executing on the data processing system can receive, from the second client device, the generated interaction log. In some implementations, the video selector can generate a performance metric for the recording of the application based on the one or more interaction events identified in the generated interaction log.

In some implementations, the application distributor can receive, from a third client device, a third request to download the application. In some implementations, the video selector can select, responsive to receiving the third request to download the application, the recording of the application executing on the first client device based on the performance metric for the recording of the application executing on the first client device exceeding a second performance metric for a recording of the application running on a second client device. In some implementations, the application distributor can transmit, to the third client device, the application and a player script. In some implementations, receipt of the player script can trigger the third client device to play the recording of the application executing on the first client device.

In some implementations, generating the performance metric can further include identifying a number of times played for the recording of the application at a plurality of client devices. In some implementations, generating the performance metric can further include determining that the number of times played for the recording of the application is above a second threshold. In some implementations, generating the performance metric can further include calculating, responsive to determining that the number of times played for the recording of the application is above the second threshold, the performance metric based on the one or more interaction events identified in the generated interaction log received from the second client device.

In some implementations, generating the performance metric can further include identifying an event type for each of the one or more interaction events identified in the generated interaction log received from the second client device. In some implementations, generating the performance metric can further include generating the performance metric based on the event type of each of the one or more interaction events.

In some implementations, generating the performance metric can further include maintaining an aggregate performance model for a plurality of recordings of execution of the application on a plurality of client devices. In some implementations, generating the performance metric can further include assigning an initial value to a weight in the aggregate performance model for the recording of execution of the application on the first client device, responsive to receiving the recording from the first client device. In some implementations, generating the performance metric can further include adjusting the weight from the initial value to a second value in the aggregate performance model, responsive to receiving the generated interaction log of the one or more interactions from the second client device.

In some implementations, the video selector can determine a start time and an end time for the recording of execution of the application on the first client device based on the performance metric and the one or more interaction events on the application by the second client device. In some implementations, the video selector can set a time length of the recording of execution of the application on the first client device based on the start time and the end time. In some implementations, wherein transmitting the application and the player script to the third client device can further include transmitting the recording with the time length set to the start time and the end time.

In some implementations, the application distributor can identify, responsive to receiving the first request to download the application, a number of times the application has been downloaded by the first client device. In some implementations, the application distributor can determine that the number of times the application has been downloaded by the first client device is equal to zero. In some implementations, transmitting the recorder script to the first client device can further include transmitting the recorder script to the first client device, responsive to determining that the number of times the application has been downloaded by the first client device is equal to zero.

In some implementations, transmitting the application and the recorder script to the first client device can further include transmitting the application and the recorder script to the first client device. In some implementations, receipt of the recorder script can trigger the first client device to record one or more second interaction events with the application. In some implementations, receipt of the recorder script can trigger the first client device to transmit the one or more second interactions to the data processing system. In some implementations, the recording aggregator can generate the recording based on the application and the one or more second interaction events with the application on the first client device.

In some implementations, transmitting the application and the recorder script to the first client device can further include transmitting the application and the recorder script to the first client device. In some implementations, receipt of the recorder script can trigger the first client device to determine that the application is executing on the first client device. In some implementations, the receipt of the recorder script can trigger the first client device to initialize recording of execution of the application, responsive to determining that the application is executing on the first client device. In some implementations, the receipt of the recorder script can trigger the first client device to record output of the application executing on the first client device for a predefined time.

In some implementations, transmitting the application and the recorder script to the first client device can further include transmitting the application and the recorder script to the first client device. In some implementations, receipt of the recorder script can trigger the first client device to monitor one or more second interaction events with the application on the first client device. In some implementations, the receipt of the recorder script can trigger the first client device to determine that a number of the one or more second interaction events exceeds a predetermined number of events. In some implementations, the receipt of the recorder script can trigger the first client device to terminate recording of execution of the application running on the first client device, responsive to determining that the number of the one or more second interaction events exceeds the predetermined number of events.

In some implementations, the video selector can identify one or more features within the recording of the application running on the first client device. In some implementations, generating the performance metric can further include generating the performance metric for the video based on the one or more identified features.

In another aspect, the present disclosure is directed to a system for automatically selecting and distributing recordings of applications executing on end user computing devices. The system includes an application distributor executed on a data processing system having one or more processors. The application distributor can receive from a first client device, a first request to download an application. The system includes a recording aggregator executed on the data processing system. The recording aggregator can determine that a number of recordings of execution of the application is below a threshold, responsive to the receipt of the first request. The application distributor can transmit, responsive to the determination that the number of recordings is below the threshold, to the first client device, the application and a recorder script. Receipt of the recorder script can trigger the first client device to record execution of the application running on the first client device and to transmit the recording to the data processing system. The recording aggregator can receive, from the first client device, the recording of the application executing on the first client device.

In some implementations, the application distributor can receive, from a second client device, a second request to download the application, subsequent to receiving the recording of the application from the first client device. In some implementations, the recording aggregator can determine that the number of recordings of execution of the application is greater than the threshold. In some implementations, the application distributor can transmit, responsive to the determination that the number of recordings of execution of the application is greater than the threshold, to the second client device, the recording of the application executing on the first client device.

In some implementations, the application distributor can transmit an interaction measurement script. In some implementations, receipt of the interaction measurement script can trigger the second client device to play the recording of the application executing on the first client device. In some implementations, the receipt of the interaction measurement script can trigger the second client device to generate an interaction log of one or more interaction events with the application running on the second client device, subsequent to playing the recording. In some implementations, the receipt of the interaction measurement script can trigger the second client device to transmit the generated interaction log to the data processing system.

In some implementations, the system can further include a video selector executed on the data processing system. In some implementations, the video selector can receive, from the second client device, the generated interaction log. In some implementations, the video selector can generate a performance metric for the recording of the application based on the one or more interaction events identified in the generated interaction log.

In some implementations, the application distributor can transmit an interaction measurement script. In some implementations, receipt of the interaction measurement script can trigger the second client device to play the recording of the application executing on the first client device. In some implementations, the receipt of the interaction measurement script can trigger the second client device to generate an interaction log of one or more interaction events with the application running on the second client device, subsequent to playing the recording. In some implementations, the receipt of the interaction measurement script can trigger the second client device to transmit the generated interaction log to the data processing system.

In some implementations, the system can further include a video selector executed on the data processing system. In some implementations, the video selector can receive, from the second client device, the generated interaction log. In some implementations, the video selector can generate a performance metric for the recording of the application based on the one or more interaction events identified in the generated interaction log.

In some implementations, the application distributor an receive, from a third client device, a third request to download the application. In some implementations, the video selector can select, responsive to the receipt of the third request to download the application, the recording of the application executing on the first client device based on the performance metric for the recording of the application executing on the first client device exceeding a second performance metric for a recording of the application running on a second client device. In some implementations, the application distributor can transmit, to the third client device, the application and a player script. In some implementations, receipt of the player script can trigger the third client device to play the recording of the application executing on the first client device.

In some implementations, the video selector can identify a number of times played for the recording of the application at a plurality of client devices. In some implementations, the video selector can determine that the number of times played for the recording of the application is above a second threshold. In some implementations, the video selector can calculate, responsive to the determination that the number of times played for the recording of the application is above the second threshold, the performance metric based on the one or more interaction events identified in the generated interaction log received from the second client device.

In some implementations, the video selector can identify an event type for each of the one or more interaction events identified in the generated interaction log received from the second client device. In some implementations, the video selector can generate the performance metric based on the event type of each of the one or more interaction events.

In some implementations, the video selector can maintain an aggregate performance model for a plurality of recordings of execution of the application on a plurality of client devices. In some implementations, the video selector can assign an initial value to a weight in the aggregate performance model for the recording of execution of the application on the first client device, responsive to receiving the recording from the first client device. In some implementations, the video selector can adjust the weight from the initial value to a second value in the aggregate performance model, responsive to receiving the generated interaction log of the one or more interactions from the second client device.

In some implementations, the video selector can determine a start time and an end time for the recording of execution of the application on the first client device based on the performance metric and the one or more interaction events on the application by the second client device. In some implementations, the video selector can set a time length of the recording of execution of the application on the first client device based on the start time and the end time. In some implementations, the application distributor can transmit the recording with the time length set to the start time and the end time.

In some implementations, the application distributor can identify, responsive to the receipt of the first request to download the application, a number of times the application has been downloaded by the first client device. In some implementations, the application distributor can determine that the number of times the application has been downloaded by the first client device is equal to zero. In some implementations, the application distributor can transmit the recorder script to the first client device, responsive to determining that the number of times the application has been downloaded by the first client device is equal to zero.

In some implementations, the application distributor can transmit the application and the recorder script to the first client device. In some implementations, receipt of the recorder script can trigger the first client device to record one or more second interaction events with the application. In some implementations, receipt of the recorder script can trigger the first client device to transmit the one or more second interactions to the data processing system. In some implementations, the recording aggregator can generate the recording based on the application and the one or more second interaction events with the application on the first client device.

In some implementations, the application distributor can transmit the application and the recorder script to the first client device. In some implementations, receipt of the recorder script can trigger the first client device to determine that the application is executing on the first client device. In some implementations, receipt of the recorder script can trigger the first client device to initialize recording of execution of the application, responsive to determining that the application is executing on the first client device. In some implementations, receipt of the recorder script can trigger the first client device to record output of the application executing on the first client device for a predefined time.

In some implementations, the application distributor can transmit the application and the recorder script to the first client device. In some implementations, receipt of the recorder script triggering the first client device to monitor one or more second interaction events with the application on the first client device. In some implementations, receipt of the recorder script triggering the first client device to determine that a number of the one or more second interaction events exceeds a predetermined number of events. In some implementations, receipt of the recorder script triggering the first client device to terminate recording of execution of the application running on the first client device, responsive to determining that the number of the one or more second interaction events exceeds the predetermined number of events.

In some implementations, the video selector can identify one or more features within the recording of the application running on the first client device. In some implementations, the video selector can generate the performance metric for the video based on the one or more identified features.

In another aspect, the present disclosure is directed to a method of automatically selecting and distributing recordings of applications executing on end user devices at a data processing system. The data processing system can receive at least one recording of the application executing on a first client device. The data processing system can transmit, to a second client device, the at least one recording of the application executing on the first client device. The data processing system can transmit, to the second client device, an interaction measurement script. Receipt of the interaction measurement script can trigger the second client device to play the at least one recording of the application executing on the first client device. The receipt of the interaction measurement script can trigger the second client device to generate an interaction log of one or more interaction events with the application running on the second client device, subsequent to playing the at least one recording. The receipt of the interaction measurement script can trigger the second client device to transmit the generated interaction log to the data processing system. The data processing system can receive the generated interaction log. The data processing system can modify the at least one recording of the application executing on the first client device based upon the generated interaction log.

In some implementations, at least one recording of the application executing on a first client device can include a plurality of recordings of the application executing on respective first client devices. In some implementations, transmitting the at least one recording of the application executing on the first client device can include selecting a recording of the plurality of recordings. In some implementations, modifying the at least one recording of the application executing on the first client device can include selecting a recording of the plurality of recordings.

In some implementations, the data processing system can generate a performance metric for the at least one recording of the application based on the one or more interaction events identified in the generated interaction log. In some implementations, modifying the at least one recording of the application may be based upon the performance metric.

In some implementations, generating the performance metric can include identifying a number of times played for the recording of the application at a plurality of client devices. In some implementations, generating the performance metric can include determining that the number of times played for the recording of the application is above a threshold. In some implementations, generating the performance metric can include c calculating, responsive to determining that the number of times played for the recording of the application is above the threshold, the performance metric based on the one or more interaction events identified in the generated interaction log received from the second client device.

In some implementations, generating the performance metric can include identifying an event type for each of the one or more interaction events identified in the generated interaction log received from the second client device. In some implementations, generating the performance metric can include generating the performance metric based on the event type of each of the one or more interaction events.

In some implementations, generating the performance metric can include maintaining an aggregate performance model for a plurality of recordings of execution of the application on a plurality of client devices. In some implementations, generating the performance metric can include assigning an initial value to a weight in the aggregate performance model for the recording of execution of the application on the first client device, responsive to receiving the recording from the first client device. In some implementations, generating the performance metric can include adjusting the weight from the initial value to a second value in the aggregate performance model, responsive to receiving the generated interaction log of the one or more interactions from the second client device.

In some implementations, the data processing system can determine a start time and an end time for the recording of the application executing on the first client device based on the performance metric and the one or more interaction events with the application by the second client device. In some implementations, the data processing system can modify time length of the recording of the application based on the start time and the end time. In some implementations, the data processing system can identify one or more features within the recording of the application executing on the first client device. In some implementations, generating the performance metric can include generating the performance metric based on the one or more identified features. In some implementations, the at least one recording of the application executing on the first client device may be modified based upon at least one further recording of the application executing on a first client device, the at least one further recording being obtained based upon the generated interaction log.

In some implementations, the data processing system can receive, from the first client device, a first request to download an application. In some implementations, the data processing system can determine that a number of recordings of execution of the application is below a threshold, responsive to receiving the first request. In some implementations, the data processing system can transmitting responsive to the determination that the number of recordings is below the threshold, to the first client device, the application and a recorder script. Receipt of the recorder script can trigger the first client device to record execution of the application running on the first client device and to transmit the recording to the data processing system. In some implementations, the data processing system can receive, from the first client device, the recording of the application executing on the first client device.

In some implementations, the data processing system can receive, from the second client device, a second request to download the application, subsequent to receiving the recording of the application from the first client device. In some implementations, the data processing system can determine that the number of recordings of execution of the application is greater than the threshold. In some implementations, transmitting the at least one recording of the application executing on the first client device to the second client device may be responsive to the determination that the number of recordings of execution of the application is greater than the threshold.

In some implementations, the data processing system can identify, responsive to receiving the first request to download the application, a number of times the application has been downloaded by the first client device. In some implementations, the data processing system can determine that the number of times the application has been downloaded by the first client device is equal to zero. In some implementations, transmitting the recorder script to the first client device may include transmitting the recorder script to the first client device, responsive to determining that the number of times the application has been downloaded by the first client device is equal to zero.

In some implementations, transmitting the application and the recorder script to the first client device can include transmitting the application and the recorder script to the first client device. Receipt of the recorder script can trigger the first client device to record one or more second interaction events with the application and to transmit the one or more second interactions to the data processing system. In some implementations, the data processing system can generate the recording based on the application and the one or more second interaction events with the application on the first client device.

In some implementations, the data processing system can transmitting the application and the recorder script to the first client device can include transmitting the application and the recorder script to the first client device. In some implementations, receipt of the recorder script can trigger the first client device to determine that the application is executing on the first client device. In some implementations, receipt of the recorder script can trigger the first client device to initialize recording of execution of the application, responsive to determining that the application is executing on the first client device. In some implementations, receipt of the recorder script can trigger the first client device to record output of the application executing on the first client device for a predefined time.

In some implementations, transmitting the application and the recorder script to the first client device can include transmitting the application and the recorder script to the first client device. In some implementations, receipt of the recorder script can trigger the first client device to monitor one or more second interaction events with the application on the first client device. In some implementations, the receipt of the recorder script can trigger the first client device to determine that a number of the one or more second interaction events exceeds a predetermined number of events. In some implementations, the receipt of the recorder script can trigger the first client device to terminate recording of execution of the application running on the first client device, responsive to determining that the number of the one or more second interaction events exceeds the predetermined number of events.

In another aspect, the present disclosure is directed to a system for automatically selecting and distributing recordings of applications executing on end user devices at a data processing system. The data processing system can receive at least one recording of the application executing on a first client device. The data processing system can transmit, to a second client device, the at least one recording of the application executing on the first client device. The data processing system can transmit, to the second client device, an interaction measurement script. Receipt of the interaction measurement script can trigger the second client device to play the at least one recording of the application executing on the first client device. The receipt of the interaction measurement script can trigger the second client device to generate an interaction log of one or more interaction events with the application running on the second client device, subsequent to playing the at least one recording. The receipt of the interaction measurement script can trigger the second client device to transmit the generated interaction log to the data processing system. The data processing system can receive the generated interaction log. The data processing system can modify the at least one recording of the application executing on the first client device based upon the generated interaction log.

In some implementations, said at least one recording of the application executing on a first client device can include a plurality of recordings of the application executing on respective first client devices. In some implementations, the data processing system is can transmit the at least one recording of the application executing on the first client device by selecting a recording of the plurality of recordings. In some implementations, the data processing system can modify the at least one recording of the application executing on the first client device by selecting a recording of the plurality of recordings.

In some implementations, the data processing system can generate a performance metric for the at least one recording of the application based on the one or more interaction events identified in the generated interaction log. In some implementations, the data processing system can modify the at least one recording of the application is based upon the performance metric.

In some implementations, the data processing system can generate the performance metric by identifying a number of times played for the recording of the application at a plurality of client devices. In some implementations, the data processing system can generate the performance metric by determining that the number of times played for the recording of the application is above a threshold. In some implementations, the data processing system can generate the performance metric by calculating, responsive to the determination that the number of times played for the recording of the application is above the threshold, the performance metric based on the one or more interaction events identified in the generated interaction log received from the second client device.

In some implementations, the data processing system can generate the performance metric by identifying an event type for each of the one or more interaction events identified in the generated interaction log received from the second client device. In some implementations, the data processing system can generate the performance metric by generating the performance metric based on the event type of each of the one or more interaction events.

In some implementations, the data processing system can generate the performance metric by maintaining an aggregate performance model for a plurality of recordings of execution of the application on a plurality of client devices. In some implementations, the data processing system can generate the performance metric by assigning an initial value to a weight in the aggregate performance model for the recording of execution of the application on the first client device, responsive to receiving the recording from the first client device. In some implementations, the data processing system can generate the performance metric by adjusting the weight from the initial value to a second value in the aggregate performance model, responsive to receiving the generated interaction log of the one or more interactions from the second client device.

In some implementations, the data processing system can determine a start time and an end time for the recording of the application executing on the first client device based on the performance metric and the one or more interaction events with the application by the second client device. In some implementations, the data processing system can modify a time length of the recording of the application based on the start time and the end time.

In some implementations, the data processing system can identify one or more features within the recording of the application executing on the first client device. In some implementations, the data processing system can generate the performance metric based on the one or more identified features. In some implementations, at least one recording of the application executing on the first client device may be modified based upon at least one further recording of the application executing on a first client device, the at least one further recording being obtained based upon the generated interaction log.

In some implementations, the data processing system can receive, from the first client device, a first request to download an application. In some implementations, the data processing system can determine that a number of recordings of execution of the application is below a threshold, responsive to receiving the first request. In some implementations, the data processing system can transmit responsive to the determination that the number of recordings is below the threshold, to the first client device, the application and a recorder script. In some implementations, receipt of the recorder script can trigger the first client device to record execution of the application running on the first client device and to transmit the recording to the data processing system. In some implementations, the data processing system can receive from the first client device, the recording of the application executing on the first client device.

In some implementations, the data processing system can receive, from the second client device, a second request to download the application, subsequent to receiving the recording of the application from the first client device. In some implementations, the data processing system can determine that the number of recordings of execution of the application is greater than the threshold. In some implementations, the data processing system can transmit the at least one recording of the application executing on the first client device to the second client device, responsive to the determination that the number of recordings of execution of the application is greater than the threshold.

In some implementations, the data processing system can identify responsive to receiving the first request to download the application, a number of times the application has been downloaded by the first client device. In some implementations, the data processing system can determine that the number of times the application has been downloaded by the first client device is equal to zero. In some implementations, the data processing system can transmit the recorder script to the first client device, responsive to determining that the number of times the application has been downloaded by the first client device is equal to zero.

In some implementations, the data processing system can transmit the application and the recorder script to the first client device. In some implementations, receipt of the recorder script can trigger the first client device to record one or more second interaction events with the application and to transmit the one or more second interactions to the data processing system. In some implementations, the data processing system can generate the recording based on the application and the one or more second interaction events with the application on the first client device.

In some implementations, the data processing system can transmit the application and the recorder script to the first client device. In some implementations, receipt of the recorder script can trigger the first client device to determine that the application is executing on the first client device. In some implementations, the receipt of the recorder script can trigger the first client device to initialize recording of execution of the application, responsive to determining that the application is executing on the first client device. In some implementations, the receipt of the recorder script can trigger the first client device to record output of the application executing on the first client device for a predefined time.

In some implementations, the data processing system can transmit the application and the recorder script to the first client device. In some implementations, receipt of the recorder script can trigger the first client device to monitor one or more second interaction events with the application on the first client device. In some implementations, receipt of the recorder script can trigger the first client device to determine that a number of the one or more second interaction events exceeds a predetermined number of events. In some implementations, receipt of the recorder script can trigger the first client device to terminate recording of execution of the application running on the first client device, responsive to determining that the number of the one or more second interaction events exceeds the predetermined number of events.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of automatically selecting and distributing recordings of applications executing on end user computing devices in a computer network environment. The various concepts introduced above and discussed in greater detail below may be implemented in any of numerous ways, as the described concepts are not limited to any particular manner of implementation.

Many end users may find it difficult to operate and use a computer program installed for the first time. Certain end users might take a prolonged amount of time looking for particular interface elements. Other end users might never find special features of the computer program due to lack of knowledge or awareness. This difficulty in operating the computer program may result in frustration on the part of the end user, leading to the degradation of human-computer interaction (HCI) between the end user and the computer program and in turn resulting in higher power consumption, network bandwidth usage, and processor time arising from the increased time for the user to learn how to operate the computer program to perform a task. Software developers or publishers may create text or video tutorials to instruct end users on how to use and operate the computer program to mitigate some of these problems. These tutorials, however, may still be lacking specific details regarding the computer program relevant to the end user, because creators of such tutorials might not know a priori what end users are seeking from the computer program. Additionally, creating such tutorials can be time consuming and require technical expertise for understanding the computer program to generate an effective tutorial for a particular computer program. Where a large number of computer programs already exist without associated tutorials, creating tutorials for existing computer programs may be prohibitive. Thus, there remain technical challenges associated with generation of effective tutorials for computer programs.

Figure 1:
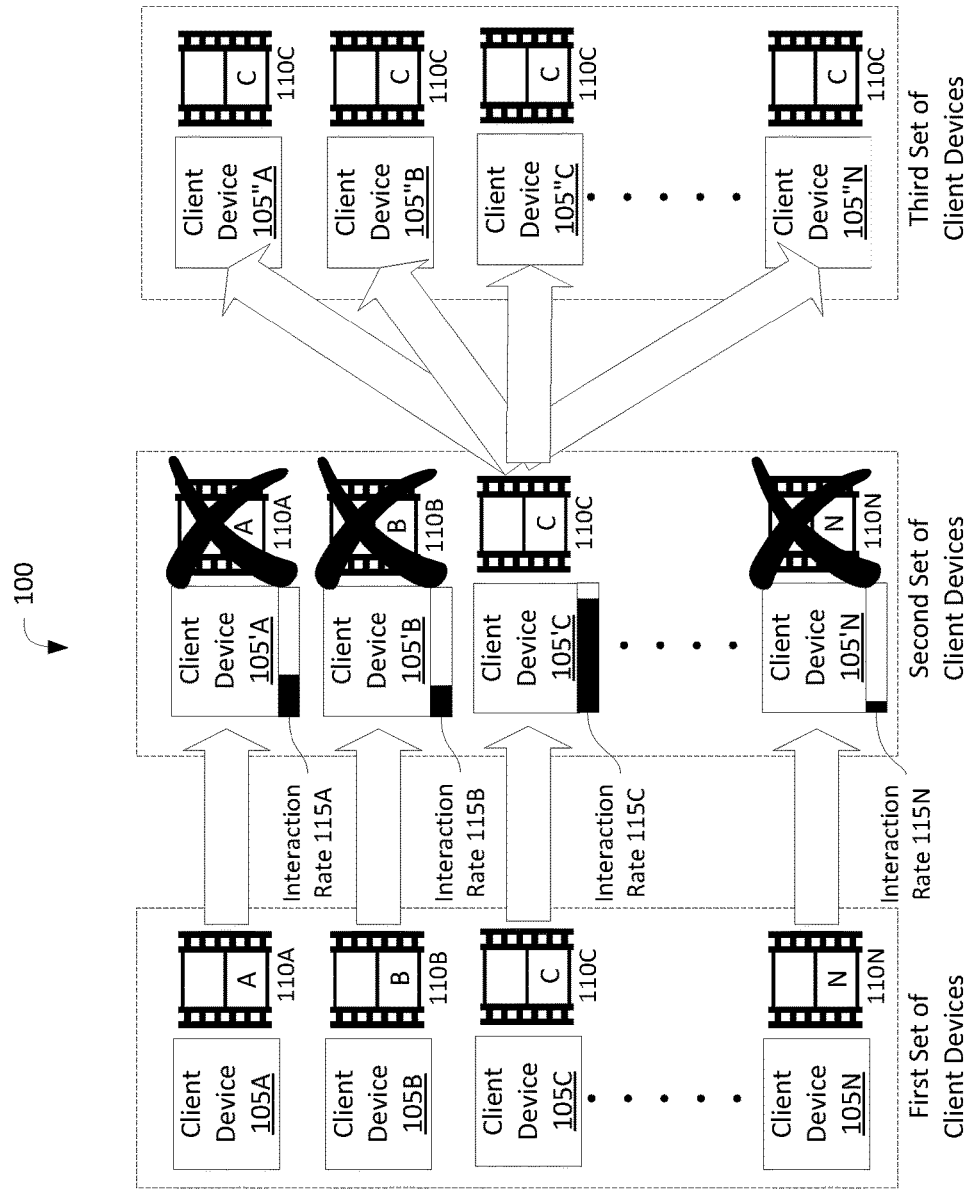
FIG. 1 is an illustration depicting one implementation of selecting and distributing tutorial videos for applications executing on end user computing devices, according to an illustrative implementation.

To address these and other technical challenges, the present disclosure provides systems and methods of automatically generating tutorial videos for instructing end users on how to use the computer program. Referring now to FIG. 1, illustrated is an implementation of automatically selecting and distributing recordings of applications executing on end user computing devices. In this example, a first set of client devices 105A-105N (referred to generally as client device(s) 105) may have transmitted a request to download an application to a server. The server may in turn determine that there are no recorded instructional videos for the application or that the number of recorded videos is less than a preset threshold. Having performed the determination, the server may transmit an application along with an additional script to record videos of the application in operation on the client device 105A-105N. Upon execution of the application, the additional script may record a video 110A-110N (referred to generally as video(s) 110, recording(s) 110, tutorial(s) 110, or by any other similar name) of the client device 105A-105N running the downloaded and installed application. The first set of client devices 105A-105N may then send back the recorded videos 110A-110N for further distribution.

After having accumulated a number of recorded videos, the server may then commence transmitting the video along with an additional script to measure the interaction rates by a second set of client devices 105'A-105'N upon receiving additional requests to download the application. Each of the second set of client devices 105'A-105'N may neither have executed the application nor played any of the recorded videos prior to the request. After the respective client device 105'A-105'N plays the recorded video 110A-110N of the application executing on one of the first set of client devices 105A-105N, the client device 105'A-105'N may execute the application and the accompanying script in turn may log the interactions (e.g., clicks, swipes, scrolls, etc.) by the client device 105'A-105'N with the application itself. Once the script has finished logging the interactions, the client device 105'A-105'N may send the log of interactions back to the server.

Using the received log of interactions, the server may identify one of the recorded videos 110A-110N as the highest performing instruction video. The server may determine the performance metrics (e.g., interaction rates 115A-115N, referred to generally as interaction rate(s) 115, interaction level(s) 115, interaction amount(s) 115, application progression(s) 115, or by any other similar term) for each respective recorded video 110A-110N from the log of interactions. The performance metric may indicate or may correspond to how informative the recorded video 110A-110N may be. The server may also maintain a model with weights for each of the recorded videos 110A-110N and may use the interaction rates from the second set of client devices 105'A-105'N as parameters to adjust the model. As the server receives more and more logged interaction events, the server can adjust the model accordingly to recalculate the performance metrics. The parameters of the model may eventually converge such that a subset of recorded videos are associated with the highest performance metrics. In the example depicted in FIG. 1, the recorded video 110C originally from client device 105C may correspond to the video with the highest interaction rate. Based on the performance metric, the server may then select the recorded video 110C as the instructional video for the application, and deselect or remove the other recorded videos from future distribution.

In turn, the server may provide the recorded video 110C for all future downloads of the application. When a third set of client devices 105"A-105"N that have neither executed the application nor played any of the recorded videos 110A-110N transmits a request to download the application, the server may transmit the application along with the selected recorded video 110C. By selecting and presenting the appropriate video for the application, the present disclosure may thus reduce the time of execution of an application by training the user to properly use and run the application, thereby saving power consumption, network bandwidth, and computer processing time.

Figure 2:
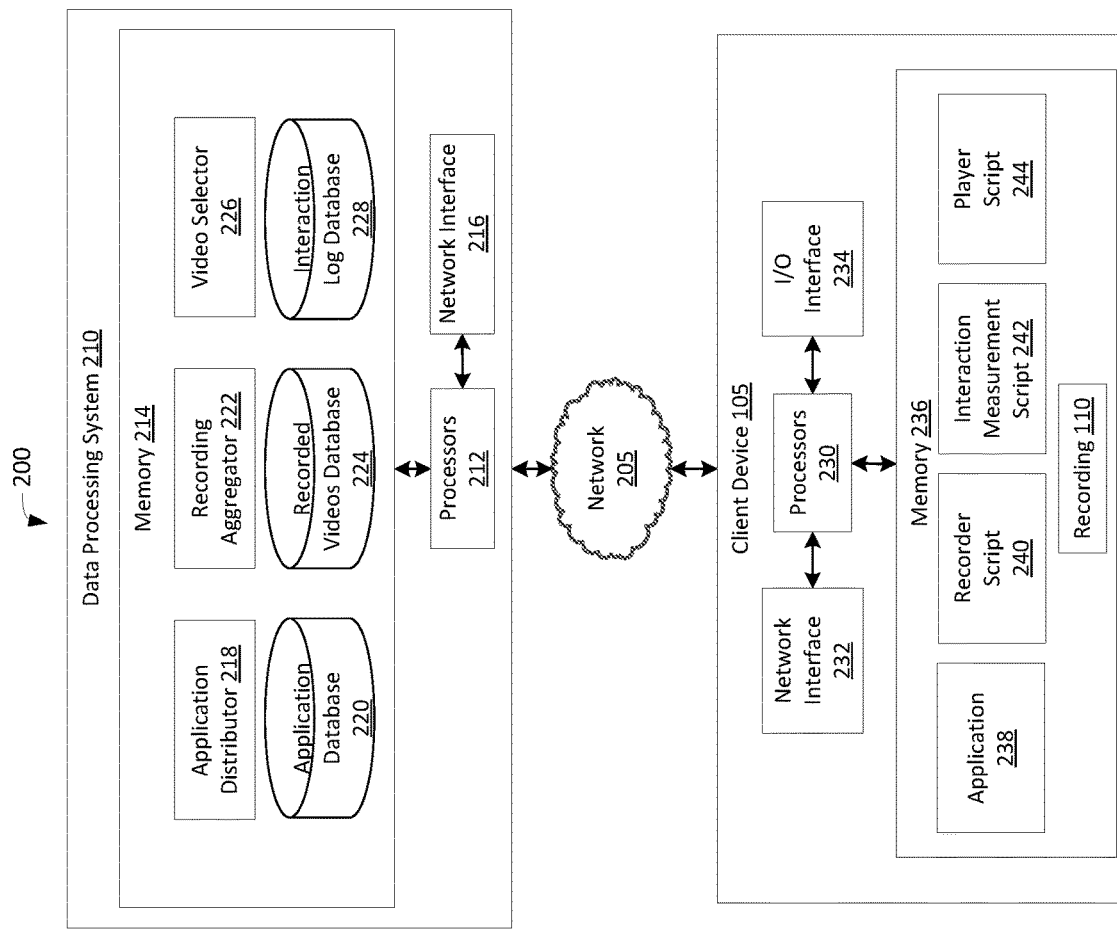
FIG. 2 is a block diagram depicting one implementation of an environment for automatically selecting and distributing recordings of applications executing on end user computing devices in a computer network environment, according to an illustrative implementation.

FIG. 2 is a block diagram depicting one implementation of an environment for automatically selecting and distributing recordings of applications executing on end user computing devices in a computer network environment. The environment 200 includes at least one data processing system 210. The data processing system 210 can include at least one processor and a memory, i.e., a processing circuit. The memory stores processor-executable instructions that, when executed by the processor, cause the processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language. The data processing system can include one or more computing devices or servers that can perform various functions.

The network 205 can include computer networks such as the internet, local, wide, metro or other area networks, intranets, satellite networks, other computer networks such as voice or data mobile phone communication networks, and combinations thereof. The data processing system 210 of the system 200 can communicate via the network 205, or at least one client device 105. The network 205 may be any form of computer network that relays information between the client device 105, data processing system 210, and one or more content sources, e.g., web servers, among others. In some implementations, the network 205 may include the Internet and/or other types of data networks, such as a local area network (LAN), a wide area network (WAN), a cellular network, satellite network, or other types of data networks. The network 205 may also include any number of computing devices (e.g., computer, servers, routers, network switches, etc.) that are configured to receive and/or transmit data within network 205. The network 205 may further include any number of hardwired and/or wireless connections. In some implementations, the client device 105 may communicate wirelessly (e.g., via WiFi, cellular, radio, etc.) via a network interface 232 or via a transceiver that is hardwired (e.g., via a fiber optic cable, a CAT5 cable, etc.) to other computing devices in network 205. The client device 105 may also communicate wirelessly with the computing devices of the network 205 using the network interface 232.

The client devices 105 can include computing devices configured to communicate via the network 205 or via the network 205 to display data (e.g., application or video). The client device 105 can include desktop computers, laptop computers, tablet computers, smartphones, personal digital assistants, mobile devices, consumer computing devices, servers, clients, digital video recorders, a set-top box for a television, a video game console, or any other computing device configured to communicate via the network 205. The client device 105 can communicate with the other computing devices via the network 205 through a network interface 232.

The client device 105 can include a processor 230 and a memory 236 (e.g., a processing circuit). The memory stores machine instructions that, when executed by processor, cause processor to perform one or more of the operations described herein. The machine instructions may include, e.g., the application 238, recorder script 240, player script 242, and interaction measurement system 244 received from the data processing system 210. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language.

The client device 105 may also include one or more input/output interfaces 234. In general, a input/output interface may refer to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more input/output interfaces 234 may be internal to a housing of the client device 105 (e.g., a built-in display, microphone, etc.) or external to the housing of the client device 105 (e.g., a monitor connected to the client device 105, a speaker connected to the client device 105, etc.), according to various implementations. In some implementations, the client device 105 may include an electronic display, which visually displays applications and videos from the data processing system 210 via the network 205.

The data processing system 210 can include at least one server. For instance, the data processing system 210 can include a plurality of servers located in at least one data center or server farm. The data processing system 210 can include at least one application distributor 218, at least one application database 220, at least one record aggregator 222, at least one recorded videos database 224, at least one video selector 226, and at least one interaction log database 228. The application distributor 218, the record aggregator 222, and the video selector 226 each can include at least one processing unit, server, virtual server, circuit, engine, agent, appliance, or other logic device such as programmable logic arrays configured to communicate with the application database 220, the recorded videos database 224, and the interaction log database 228 and with other computing devices (e.g., the client device 105) via the network 205.

The application distributor 218, the record aggregator 222, and the video selector 226 can include or execute at least one computer program or at least one script. The application distributor 218, the record aggregator 222, and the video selector 226 can be separate components, a single component, or part of the data processing system 210. The application distributor 218, the record aggregator 222, and the video selector 226 can include combinations of software and hardware, such as one or more processors 212 configured to execute one or more scripts stored on memory 214. Accordingly, in some implementations, application distributor 218, record aggregator 222, and/or video selector 226 may comprise applications, services, servers, daemons, routines, or other executable logic for performing the functions described herein. In some implementations, the data processing system 210 can communicate with other computing devices (e.g., client device 105) via the network 205 using a network interface 216.

The data processing system 210 can also include one or more content repositories or databases (e.g., application database 220, the recorded videos database 224, and the interaction log database 228). The databases can be local to the data processing system 210. In some implementations, the databases can be remote to the data processing system 210 but can communicate with the data processing system 210 via the network 205. The databases can include applications, programs, software, video content, audiovisual content, among others, to serve to a client device 105. Additional details of the contents of the database will be provided below.

In the context of FIG. 1, for the first set of client devices 105A-105N, the application distributor 218 can provide, distribute, or otherwise transmit the application 238 and the recorder script 240 to record the application 238 executing on the client device 105A-105N. In some implementations, the application distributor 218 can receive a request to download the application 238 from a client device 105. The client device 105 may be part of the first set of client devices 105A-105N, and may have not downloaded, installed, or executed the application 238 previously. The application 238 may include a computer program, software, an executable file, or otherwise machine executable format in any format for execution at the client device 105. The application 238 may be a mobile application, such as a word processor, enterprise software, or a video game, among others. The application 238 may be provided by a third party computing device to the data processing system 210 for storage at the application database 220. In some implementations, the request to download the application 238 may be from a program running on the client device 105, such as an application distribution platform (e.g., mobile application store, software catalogue, etc.). The application distribution platform can list the applications available to download from the application database 220. The application distribution platform can include the application 238 as one of the applications listed available for download.

Responsive to receiving the request to download from the client device 105, the recording aggregator 222 can determine whether a number of recordings 110 of execution of the application 238 is less than a threshold. The threshold may be used to aggregate or accumulate more recordings 110 of the application 238 executed on a plurality of client devices 105. The recording aggregator 222 can identify the number of recordings 110 from the recorded videos database 224. The recorded videos database 224 can list or include recordings 110 of the application executed across the first set of client devices 105. In some implementations, the recorded videos database 224 can maintain a counter or index for counting the number of recordings 110. In some implementations, the threshold may be a predefined arbitrary number. In some implementations, the threshold may be preset by the third-party computing device providing the application 238.

If the recording aggregator 222 determines that the number of recordings 110 of the execution of the application 238 is less than the threshold, the application distributor 218 can transmit the application 238 and the recorder script 240 to the client device 105 via the network 205. In some implementations, prior to the transmission, the application distributor 218 can determine whether the client device 105 has downloaded or installed the application 238 previously. In some implementations, the application distributor 218 can identify a number of times the application 238 has been downloaded by the client device 105. The number of times may be maintained by the application distributor 218 on the applications database 220. If the application distributor 218 determines that the number of times is equal to zero, the application distributor 218 can determine that the client device 105 has not downloaded or installed the application 238 previously. Responsive to determining that the client device 105 has not downloaded or installed the application 238 previously, the application distributor 218 can transmit the application 238 and the recorder script 240 to the client device 105. In some implementations, the application distributor 218 can determine whether the client device 105 has downloaded or installed the application 238 previously based on the request. In some implementations, the request to download the application 238 may include an indicator specifying whether the application 238 has been installed or downloaded by the client device 105. A user of the client device 105 may have previously installed the application 238 but then uninstalled the application 238 from the client device 105. In some implementations, based on the indicator of the request, the application distributor 218 can transmit the application 238 and the recorder script 240 to the client device 105. In some implementations, prior to providing the recorder script 240 to the client device 105, the application distributor 218 can send a prompt to the client device 105 for permission to send the recorder script 240 for recording the execution of the application 238 on the client device 105.

The client device 105 can receive the application 238 and the recorder script 240 from the application distributor 218 via the network 205. Upon receipt, the client device 105 can store or install the application 238 and the recorder script 240 onto the memory 236. In some implementations, receipt of the application 238 and the recorder script 240 can cause or trigger the client device 105 to perform functionalities specified in the application 238 or the recorder script 240. The client device 105 can execute the application 238 using the processor 230. The recorder script 240 can determine whether application 238 is executing. In some implementations, the recorder script 240 can monitor the processor 230 and memory 236 of the client device 105 to detect the instantiation of the application 238. If the recorder script 240 determines that the application 238 is not yet executing on the client device 105, the recorder script 240 can continue to monitor for the instantiation of the application 238 on the client device 105.

If the recorder script 240 determines that the application 238 is executing on the client device 105, the recorder script 240 can start recording the execution of the application 238 on the client device 105. In some implementations, the recorder script 240 can record an output of the application 238 executing on the client device 105. In some implementations, the recorder script 240 can instantiate or write a video file in any format (e.g., Audio Video Interleaved (.avi), QuickTime (.mov), MPEG (.mp4), Ogg (.ogg), etc.) to record the video. In some implementations, although referred to as a "video", recorder script 240 may record a set of interactions (e.g. select menu 1 at time 00:01; select menu item a at time 00:03; click at coordinates 100,200 at time 00:08; type characters "abc" at time 00:12; etc.). This may allow for recording of interactions with reduced bandwidth or storage space, greater compression, etc. Such recordings may, in some implementations, be re-executed in a virtual machine or sandboxed application by a server, and an actual video of rendered output captured. In some implementations, the recorder script 240 can continue writing onto the memory 236 the video file as the application 238 is executing on the client device 105. In some implementations, recorder script 240 can record an entire display (e.g., what an end user would see while displayed on the electronic display of the client device 105) as the application 238 is executing on the client device 105. In some implementations, the recorder script 240 can identify dimensions of the application 238 executing on the client device 105. In some implementations, the recorder script 240 can limit the recording 110 of the application 238 executing on the client device 105 to the identified dimensions of the application 238.

In some implementations, the recorder script 240 can record the output of the application 238 executing on the client device 105 for a predefined time. In some implementations, the recorder script 240 can maintain a timer for a recording time of the recording 110 of the execution of the application 238 on the client device 105. In some implementations, the recorder script 240 can compare the recording time to a predefined time or a maximum time frame. The maximum time frame can correspond to a maximum time of the recording 110 of the execution of the application 238 on the client device 105. In some implementations, the maximum time frame may be predefined based on storage amount at the data processing system 210. In some implementations, the maximum time frame may be preset by the third party computing device providing the application 238. If the recording time is greater than or equal to the maximum time frame, the recorder script 240 can terminate recording of the execution of the application 238 on the client device 105. If the recording time is less than the maximum time frame, the recorder script 240 can continue to record the execution of the application 238 on the client device 105.

In some implementations, the recorder script 240 can maintain a number of interactions by the client device 105 with the application 238 using a counter. The recorder script 240 can use an event listener or event handler to monitor for interactions with the application 238. The interactions may correspond to user interaction events on the application 238. In some implementations, the recorder script 240 can identify a type of interaction (e.g., clicks, swipes, scrolls, etc.) with the application 238 for each interaction detected. In some implementations, the recorder script 240 can determine whether the identified type of interaction is one of a predefined set of interactions. If the type of interaction is one of the predefined set of interactions, the recorder script 240 can increment the counter. In some implementations, the recorder script 240 can compare the number of interactions to a maximum number of interactions. If the recorder script 240 determines that the number of interactions is greater than or equal to the maximum number of interactions, the recorder script 240 can terminate the recording 110 of the application 238 executing on the client device 105. If the recorder script 240 determines that the number of interactions is less than the maximum number of interactions, the recorder script 240 can continue to record the application 238 executing on the client device 105.

In some implementations, the recorder script 240 can maintain a log of interactions by the client device 105 with the application 238. The log of interactions may include a type of the interaction, a time of the interaction, and a coordinate of the interaction. The recorder script 240 can record a screen tap event occurring at the pixel position (e.g., 340, 125) on the display on the client device 105 into the log of interactions. In some implementations, the recorder script 240 can determine whether the application 238 is executing on the client device 105. In some implementations, the recorder script 240 can initiate or commence recording to the log of interactions, responsive to determining that the application 238 is executing. In some implementations, the maintenance of the log of interactions may be for a predefined period of time. In some implementations, the recorder script 240 can transmit the log of interactions by the client device 105 with the application 238 to the recording aggregator 222 via the network interface 232 and the network 205.

Once the recording of the application 238 executing on the client device 105 is terminated, the recorder script 240 can transmit the recording 110 (e.g., video 110A-110N) to the recording aggregator 222 via the network interface 232 and the network 205. Subsequent to the client device 105 transmitting the application 238 and the recording 110 of the application 238, the recording aggregator 222 can save or store the received recording 110 onto the recorded videos database 224. The recording aggregator 222 can assign a recording identifier for the received recording 110 in the recorded videos database 224. The recording aggregator 222 can assign or associate the recording 110 with the corresponding application 238 with an application identifier. In some implementations, the recording aggregator 222 can increment the counter for the number of recordings 110A-110N, responsive to receiving the recording of the application 238 executing on the client device 105.

In some implementations, if the recording aggregator 222 receives the log of interactions (without a recording) on the application 238 by the client device 105, the recording aggregator 222 can generate the recording 110 of the application 238 executing on the client device 105 from the log of interactions. In some implementations, the recording aggregator 222 can access an image (e.g., skin or a screenshot) of the application 238. In some implementations, the recording aggregator 222 can identify the type of the interaction, time of the interaction, and the coordinate of the interaction for each interaction recorded in the log of interactions. In some implementations, the recording aggregator 222 can generate a corresponding image (e.g., mouse icon) for each interaction. In some implementations, the recording aggregator 222 can overlay the corresponding image onto the image of the application 238 for each interaction recorded in the log of interactions frame by frame to generate the recording 110 of the application 238 executing on the client device 105.

The video selector 226 can generate a performance metric for each received recording 110 for the application 238 on the recorded videos database 224. In some implementations, the video selector 226 can set the performance metric for each received recording 110 to an initial value. The initial value may correspond to a default starting value to be adjusted based on subsequent data. The performance metric may be later used to select one or more of the recordings 110 of the application 238 executing on the client device 105. The performance metric may be later used to select one or more of the recordings 110 of the application 238 executing on the client device 105. The performance metric may be an interaction rate, duration of the recording 110 played on another client device 105, conversion rate, among others, or any combination thereof. In some implementations, the performance metric may be a metric associated with the computer program itself such as a level obtained, a number of features utilized, a number of predetermined achievements obtained, or any other such identification. In some implementations, the video selector 226 can store the performance metric for the received recordings 110 at the recorded videos database 224.

In some implementations, the video selector 226 can maintain an aggregate performance model for the received recordings 110 of the execution of the application 238 on one or more client devices 105. The video selector 226 can use the aggregate performance model later to select one or more of the recordings 110 of the application 238 for distribution to other client devices 105. The aggregate performance model may be any model used in machine learning, such as an artificial neural network (ANN), a support vector machine (SVM), deep structural learning model, unsupervised learning models, or supervised learning models, among others. In some implementations, in the aggregate performance model, the video selector 226 can assign an initial value to a weight for each recording 110 for the application 238 in the recorded videos database 224. The initial value may be equal for each recording 110 for the application 238. If there are N recordings 110 for the application 238 and the aggregate performance model used is an artificial neural network, the video selector 226 can initially assign 1/N as the initial weight for each recording. In some implementations, the video selector 226 can store the aggregate performance model for the received recordings 110 at the recorded videos database 224.

In some implementations, the initial value set for the aggregate performance model for the received recording 110 of the application 238 executing on the client device 105 may be based on the one or more features identified from the recording. In some implementations, the initial value set for the performance metric for the received recording 110 of the application 238 executing on the client device 105 may be based on the one or more features identified from the recording. In some implementations, the video selector 226 can use an image recognition algorithm to identify one or more features within the recording 110 of the application 238 executing on the client device 105. The image recognition algorithm may include, e.g., edge detection algorithms, corner detection algorithms, blob detection algorithms, scene change algorithms, or any other machine learning techniques to identify objects within the recording 110 of the application 238 executing on the client device. In some implementations, the video selector 226 can set the initial value set for the recording 110 based on a number of features or a type of the feature identified from the respective recording. If the video selector 226 detects that there is a scene change sometime during the recording, the video selector 226 can assign a higher initial score than recordings 110 without scene changes. In some implementations, the initial value set based on the number of features or the type of features may be adjusted using a multiplicative factor. The higher the number of features identified in the recording, the higher the multiplicative factor used by the video selector 226 to set the initial value for the performance metric of the recording 110 of the application 238 executing on the client device 105.

Subsequently, for the second set of client devices 105', the application distributor 218 can provide, distribute, or otherwise transmit the application 238 and the interaction measurement script 242 to log the interactions with the application 238 by the client device 105' subsequent to the playing of one of the recordings 110. If the application distributor 218 determines that the number of recordings 110 of the execution of the application 238 is greater than or equal to the threshold, the recording aggregator 222 can determine whether a number of times played for the recordings 110 of the execution of the application 238 is less than a threshold number of times played. The threshold number of times played may signify a minimum number of samples for collecting interaction data across the plurality of client devices 105 to determine whether any one of the recordings 110 are effective in instructing the user how to use the application 238. Subsequent to storing the recordings 110 of the execution of the application 238, the recording aggregator 222 can maintain a counter for the number of times played at a plurality of client devices 105 across all the recordings 110 of the execution of application 238. Each time any of the recordings 110 is played another client device 105, the recording aggregator 222 can increment the counter for the number of times played.

If the recording aggregator 222 determines that the number of times played for the recordings 110 of the execution of the application 238 is less than the threshold number of times, the video selector 226 can select one of the recordings 110 from the recorded videos database 224. In some implementations, if the recording aggregator 222 determines that the number of times played for the recordings 110 of the execution of the application 238 is less than the threshold number of times, the video selector 226 can select one of the recordings 110 from the recorded videos database 224 at random using a pseudo-number generator. The pseudo-number generator may allow the video selector 226 to avoid a locally optimal selection of the recording 110 instead of the globally optimal selection of the recording 110 using the aggregate performance model.

In some implementations, the video selector 226 can select a recording 110 from a plurality of recordings 110 in the recorded videos database 224 based on the performance metric of the respective recording. In some implementations, the video selector 226 can use the aggregate performance model to calculate the performance metrics for each of the recordings 110. In some implementations, in selecting the recording, the application distributor 218 can set or adjust the performance metrics by a random weight generated by the pseudo-number generator. In some implementations, the video selector 226 can rank the recordings 110 of the recorded videos database 224 by the respective performance metrics. In some implementations, the video selector 226 can select the recording 110 corresponding to the highest ranking performance metric. In some implementations, the video selector 226 can select a recording 110 at random from a subset of recordings 110 with the highest N ranking performance metrics.

Responsive to selecting one of the recordings 110 from the recorded videos database 224, the application distributor 218 can transmit the application 238, the selected recording, and the interaction measurement script 242 to the client device 105 via the network 205. In some implementations, the application distributor 218 can receive a request to download the application 238 from another client device 105, subsequent to receiving the recording 110 of the application 238 executing on the first client device 105. The interaction measurement script 242 can be used to log interactions at the client device 105 on the application 238 to allow for the video selector 226 to select optimal videos in instructing an end user how to operate the application 238.

In some implementations, prior to the transmission of the interaction measurement script 242 and the recording, the application distributor 218 can determine whether the client device 105 has downloaded or installed the application 238 previously. In some implementations, the application distributor 218 can identify a number of times the application 238 has been downloaded by the client device 105. The number of times may be maintained by the application distributor 218 on the applications database 220. If the application distributor 218 determines that the number of times is equal to zero, the application distributor 218 can determine that the client device 105 has not downloaded or installed the application 238 previously. Responsive to determining that the client device 105 has not downloaded or installed the application 238 previously, the application distributor 218 can transmit the application 238 and the interaction measurement script 242 to the client device 105. In some implementations, the application distributor 218 can determine whether the client device 105 has downloaded or installed the application 238 previously based on the request. In some implementations, the request to download the application 238 may include an indicator specifying whether the application 238 has been installed or downloaded by the client device 105. A user of the client device 105 may have previously installed the application 238 but then uninstalled the application 238 from the client device 105. In some implementations, based on the indicator of the request specifying that the client device 105 has not installed the application 238, the application distributor 218 can transmit the application 238, the selected recording, and interaction measurement script 242 to the client device 105. In some implementations, prior to providing the interaction measurement script 242 to the client device 105, the application distributor 218 can send a prompt to the client device 105 for permission to send the interaction measurement script 242 for recording interactions with the application 238 by the client device 105.

The client device 105 can receive the application 238, the selected recording, and the interaction measurement script 242 from the application distributor 218 via the network 205. In some implementations, the client device 105 can also receive the recording identifier corresponding to the selected recording. Upon receipt, the client device 105 can store or install the application 238 and the interaction measurement script 242 onto the memory 236. In some implementations, receipt of the application 238 and the interaction measurement script 242 can cause or trigger the client device 105 to perform functionalities specified in the application 238 or the interaction measurement script 242. The client device 105 can play the selected recording 110 of the application 238 executing on another client device 105. Subsequent to playing the recording, the client device 105 can execute the application 238 using the processor 230. The interaction measurement script 242 can determine whether application 238 is executing. In some implementations, the interaction measurement script 242 can monitor the processor 230 and memory 236 of the client device 105 to detect the instantiation of the application 238. If the interaction measurement script 242 determines that the application 238 is not yet executing on the client device 105, the interaction measurement script 242 can continue to monitor for the instantiation of the application 238 on the client device 105 for a predetermined period of time.

If the interaction measurement script 242 determines that the application 238 is executing on the client device 105, the interaction measurement script 242 can start logging or recording one or more interactions with the application 238 executing on the client device 105. Subsequent to the playing of the recording, the interaction measurement script 242 can generate an interaction log. The interaction measurement script 242 can instantiate, create, or otherwise generate an interaction log file recording the interactions onto the memory 236 of the client device 105. The interaction measurement script 242 can monitoring for the triggering of event listeners or event handlers (e.g., scrolling, taps, clicking, swiping, keypress, etc.) while the application 238 is executing on the client device 105. In some implementations, the interaction measurement script 242 can identify a type of interaction, a coordinate of the interaction, and a time of the interaction. Each time the triggering of the event listeners or event handlers is detected, the interaction measurement script 242 can write to the log file on the memory 236. In some implementations, the interaction measurement script 242 can write the identified type of interaction, the coordinate of interaction, and the time of interaction. In some implementations, the interaction measurement script 242 can transmit the identified type of interaction, the coordinate of interaction, and the time of interaction with the application 238 by the client device 105, as the corresponding event listener or event handler is triggered.

In some implementations, the interaction measurement script 242 can record interactions with the application 238 executing on the client device 105 for a predefined time. In some implementations, the interaction measurement script 242 can maintain a timer for a recording time of the recording 110 of the interactions with the application 238 by the client device 105. In some implementations, the interaction measurement script 242 can compare the recording time to a predefined time or a maximum time frame. The maximum time frame can correspond to a maximum time of the recording 110 of the interactions with the application 238 by the client device 105. In some implementations, the maximum time frame may be predefined based on storage amount at the data processing system 210. In some implementations, the maximum time frame may be preset by the third party computing device providing the application 238. If the recording time is greater than or equal to the maximum time frame, the interaction measurement script 242 can terminate recording of the interactions with the application 238 by the client device 105. If the recording time is less than the maximum time frame, the interaction measurement script 242 can continue to record the interactions with the application 238 by the client device 105.

In some implementations, the interaction measurement script 242 can maintain a number of interactions by the client device 105 with the application 238 using a counter. In some implementations, the interaction measurement script 242 can determine whether the identified type of interaction is one of a predefined set of interactions. The interaction measurement script 242 can record clicks and keypresses but exclude swipes and scrolls from the log of interactions. If the type of interaction is one of the predefined set of interactions, the interaction measurement script 242 can increment the counter. In some implementations, the interaction measurement script 242 can compare the number of interactions to a maximum number of interactions. If the interaction measurement script 242 determines that the number of interactions is greater than or equal to the maximum number of interactions, the interaction measurement script 242 can terminate the recording of interactions with the application 238 by the client device 105. If the interaction measurement script 242 determines that the number of interactions is less than the maximum number of interactions, the interaction measurement script 242 can continue to record the interactions with the application 238 by the client device 105.

The interaction measurement script 242 can determine whether the execution of the application 238 on the client device 105 is terminated. Upon termination of the application 238 or any of the other conditions detailed above, the interaction measurement script 242 can transmit the interaction log to the video selector 226. In some implementations, the interaction measurement script 242 can transmit the interaction log to the video selector 226, responsive to receiving a request from the video selector 226. In some implementations, the interaction measurement script 242 can transmit the interaction log and the recording identifier corresponding to the recording 110 played at the client device 105 to the video selector 226.

If the interaction measurement script 242 determines that the application 238 did not execute on the client device 105 within the predetermined period of time, the interaction measurement script 242 can set the interaction log to null, indicating lack of interactions with the application 238 by the client device 105. The interaction measurement script 242 can transmit the interaction log set to null to the video selector 226 via the network interface 232. In some implementations, the interaction measurement script 242 can transmit an indicator specifying the lack of interactions with the application 238 by the client device 105. The interaction measurement script 242 can transmit, to the video selector 226, the recording identifier corresponding to the recording 110 played at the client device 105 with the indicator or the interaction log set to null.

From the client device 105, the video selector 226 can receive the interaction log recording interactions with the application 238 by the client device 105 subsequent to playing the recording. Subsequent to receiving the interaction log from the client device 105, the video selector 226 can save or store the interaction log to the interaction log database 228. The interaction log database 228 can maintain the interaction logs by recordings 110 of the execution of the application 238. The video selector 226 can associate the interaction log to the corresponding recording 110 using the recording identifier for the recording. In some implementations, the video selector 226 can increment the counter for the number of played recordings 110, responsive to receiving the interaction log.

For each recording 110 in the recorded videos database 224, the video selector 226 can update the performance metric based on the corresponding received interaction log from the client device 105. The video selector 226 can update the aggregate performance model for the recordings 110 based on the interaction log from the client device 105. The video selector 226 can identify which recording 110 corresponds to the interaction log based on the recording identifier. In some implementations, the video selector 226 can access the interaction log database 228 to retrieve or obtain the interaction log to update the performance metric or the aggregate performance model. In some implementations, the video selector 226 can update the performance metric or the aggregate performance model at periodic intervals. In some implementations, the video selector 226 can adjust one or more weights of the aggregate performance model to another value responsive to receiving the interaction log.

In some implementations, the video selector 226 can update the performance metric or the aggregate performance model for the recording 110 of the execution of the application 238, subsequent to a number of times the recording 110 was played reaching a threshold. The video selector 226 can identify the number of times the recording 110 of the execution of the application 238 was played at a plurality of client devices 105. In some implementations, the video selector 226 can access the recorded videos database 224 to identify the number of times the recording 110 was played. In some implementations, the video selector 226 can determine whether the number of times the recording 110 was played is greater than or equal to a threshold number of times played. The threshold number of times played may indicate or specify a cutoff for a sufficient sample size for updating the calculation of the performance metric or the aggregate performance model. If the video selector 226 determines that the number of times the recording 110 of the execution of the application 238 is greater than or equal to the threshold number, the video selector 226 can update the performance metric or the aggregate performance model. If the video selector 226 determines that the number of times the recording 110 of the execution of the application 238 is less than the threshold number, the video selector 226 can continue to accumulate interaction logs from the plurality of client devices 105 for the recording 110 of the execution of the application 238.

To update the performance metric or the aggregate performance model for each recording, the video selector 226 can iterate through each of the interactions in the interaction log for the recording 110 of the execution of the application 238. In some implementations, the video selector 226 can iterate through each of the interaction logs for the recording 110 of the execution of the application 238. In some implementations, the video selector 226 can update the performance metric or the aggregate performance model with each interaction identified, each interaction log, or with all the interaction logs for the recording 110 of the application 238. Iterating through the interactions recorded in each interaction log, the video selector 226 can identify the type of interaction (event type), the coordinate of the interaction (event coordinate, position, or location), and the time of the interaction (event time). The video selector 226 can use the identified type of interaction, coordinate of the interaction, and the time of interaction in updating the calculation of the performance metric or the aggregate performance model for the recording.

Based on the type of interaction, the video selector 226 can calculate, adjust, or otherwise update the performance metric for the recording 110 of the execution of the application 238. In some implementations, the video selector 226 can identify a positive adjustment or a negative adjustment from the initial value or another value to the performance metric for the recording 110 based on the type of interaction. The positive adjustment and the negative adjustment may be each a fixed consonant (e.g., multiplicative factor greater than or less than 1) or a range of values depending on the type of interaction. In some implementations, the video selector 226 can identify whether the identified type of interaction belongs in a positive set of interaction types or a negative set of interaction types. The positive set of interaction types may correspond to the types of interactions with the positive adjustment (e.g., click, screen tap, scroll down, etc.). The negative set of interaction types may correspond to the types of interactions with the negative adjustment (e.g., mouse move, scroll up, on hover, etc.). In general, the positive set of interaction types may be indicative of a user properly operating the application 238 in a proficient manner subsequent to watching the recording. In contrast, the negative set of interaction types may be indicative of a user operating the application 238 in an untrained or an otherwise undesirable manner after watching the recording. If the type of interaction is identified as belonging to the positive set, the video selector 226 can increment, modify, or otherwise adjust the performance metric by the positive adjustment. If the type of interaction is identified as belonging to the negative set, the video selector 226 can increment, modify, or otherwise adjust the performance metric by the negative adjustment.

In some implementations, the video selector 226 can adjust, change, or otherwise update the aggregate performance model based on the type of interaction. In some implementations, using the type of interaction, the video selector 226 can adjust, change, or otherwise update the one or more weights of the aggregate performance model. In some implementations, the video selector 226 can identify a positive weight adjustment or a negative weight adjustment from the initial value or another value to the one or more weights of the aggregate performance model for the recordings 110 based on the type of interaction. The positive weight adjustment and the negative weight adjustment may be each a fixed consonant (e.g., multiplicative factor greater than or less than 1) or a range of values depending on the type of interaction. The positive weight adjustment to the one or more weights of the aggregate performance model may result a higher probability that the respective recording 110 of the execution of the application 238 is selected in response to future requests for downloading the application 238. The negative weight adjustment to the one or more weights of the aggregate performance model may result a lower probability that the respective recording 110 of the execution of the application 238 is selected in response to future requests for downloading the application 238. In some implementations, the video selector 226 can identify whether the identified type of interaction belongs in a positive set of interaction types or a negative set of interaction types. If the type of interaction is identified as belonging to the positive set, the video selector 226 can increment, modify, or otherwise adjust the one or more weights of the aggregate performance model by the positive weight adjustment. If the type of interaction is identified as belonging to the negative set, the video selector 226 can increment, modify, or otherwise adjust the one or more weights of the aggregate performance model by the negative weight adjustment.

Based on the coordinate of interaction, the video selector 226 can calculate, adjust, or otherwise update the performance metric for the recording 110 of the execution of the application 238. In some implementations, the video selector 226 can identify a positive adjustment or a negative adjustment to the performance metric for the recording 110 based on the coordinate of interaction. The positive adjustment and the negative adjustment may be each a fixed consonant (e.g., multiplicative factor greater than or less than 1) or a range of values depending on the coordinates of the interaction. In some implementations, the video selector 226 can identify whether the identified coordinate of interaction belongs in a positive range of coordinates or a negative range of coordinates. The positive range of coordinates may correspond to the coordinates of interactions with the positive adjustment. The negative range of coordinates may correspond to the coordinates of interactions with the negative adjustment. In general, the positive range of coordinates may be indicative of a user operating the application 238 in a proficient manner subsequent to watching the recording. On the other hand, the negative range of coordinates may be indicative of a user operating the application 238 in an untrained or an otherwise undesirable manner even after watching the recording 110 of another user operating the application 238. In some implementations, the positive range of coordinates and the negative range of coordinates may be predefined. In some implementations, the video selector 226 can use the one or more identified features in the recording 110 using image recognition algorithms to set the positive range of coordinates and the negative range of coordinates. By applying the image recognition algorithm, the video selector 226 can detect a command button of a user interface, identify the range of coordinates for the command button, and set the identified range of coordinates as the positive range of coordinates. If the coordinate of the interaction is identified as belonging to the positive range, the video selector 226 can increment, modify, or otherwise adjust the performance metric by the positive adjustment. If the type of interaction is identified as belonging to the negative range, the video selector 226 can increment, modify, or otherwise adjust the performance metric by the negative adjustment.

In some implementations, the video selector 226 can adjust, change, or otherwise update the aggregate performance model based on the coordinate of interaction. In some implementations, the video selector 226 can identify a positive weight adjustment or a negative weight adjustment to the one or more weights of the aggregate performance model for the recording 110 based on the coordinate of interaction. The positive weight adjustment and the negative weight adjustment may be each a fixed consonant (e.g., multiplicative factor greater than or less than 1) or a range of values depending on the coordinates of the interactions. In some implementations, the video selector 226 can identify whether the identified coordinate of interaction belongs in the positive range of coordinates or the negative range of coordinates. The positive weight adjustment to the one or more weights of the aggregate performance model may result a higher probability that the respective recording 110 of the execution of the application 238 is selected in response to future requests for downloading the application 238. The negative weight adjustment to the one or more weights of the aggregate performance model may result a lower probability that the respective recording 110 of the execution of the application 238 is selected in response to future requests for downloading the application 238. If the coordinate of interaction is identified as belonging to the positive range, the video selector 226 can increment, modify, or otherwise adjust the one or more weights of the aggregate performance model by the positive weight adjustment. If the coordinate of interaction is identified as belonging to the negative range, the video selector 226 can increment, modify, or otherwise adjust the one or more weights of the aggregate performance model by the negative weight adjustment.

Based on the time of the interaction, the video selector 226 can calculate, adjust, or otherwise update the performance metric for the recording 110 of the execution of the application 238. The time of the interaction may be relative to a start of execution of the application 238 subsequent to playing the recording. In some implementations, the video selector 226 can identify a positive adjustment or a negative adjustment from the initial value or another value based on the time of the interaction. The positive adjustment and the negative adjustment may be each a fixed consonant (e.g., multiplicative factor greater than or less than 1) or a range of values depending on the time of interaction. In some implementations, the video selector 226 can identify whether the identified time of interaction belongs in a positive range of times or a negative range of times. The positive range of times may correspond to the times of interactions with the positive adjustment. The negative range of times may correspond to the coordinates of interactions with the negative adjustment. In general, the positive range of times may be indicative of a user operating the application 238 in a proficient manner subsequent to watching the recording, and may correspond to an interaction occurring early in the interaction log. On the other hand, the negative times of times may be indicative of a user operating the application 238 in an untrained or an otherwise undesirable manner even after watching the recording 110 of another user operating the application 238, and may correspond to an interaction occurring later in the interaction log. If the time of the interaction is identified as belonging to the positive range, the video selector 226 can increment, modify, or otherwise adjust the performance metric by the positive adjustment. If the time of interaction is identified as belonging to the negative range, the video selector 226 can increment, modify, or otherwise adjust the performance metric by the negative adjustment.

In some implementations, the video selector 226 can calculate, adjust, or otherwise update the performance metric for the recording 110 of the execution of the application based on a plurality of times of the interactions. In some implementations, the video selector 226 can identify the plurality of times of the interactions. In some implementations, the video selector 226 can determine or calculate a density of the plurality of times of the interactions. The density of the plurality of times of the interactions may indicate a degree of immediacy or sparsity between each interaction recorded in the interaction log. In some instances, the greater the density of the plurality of times of the interactions, the more likely that the user operating the application 238 subsequent to watching the recording 110 may be properly using the application 238. In some implementations, the video selector 226 can determine whether the density of the plurality of times of the interactions is greater than or equal to a threshold density. If the video selector 226 determines that the density is greater than or equal to the threshold density, the video selector 226 can adjust the performance metric by the positive adjustment. If the video selector 226 determines that the density is less than the threshold density, the video selector 226 can adjust the performance metric by the negative adjustment.

In some implementations, the video selector 226 can adjust, change, or otherwise update the aggregate performance model based on the time of interaction. In some implementations, the video selector 226 can identify a positive weight adjustment or a negative weight adjustment to the one or more weights of the aggregate performance model for the recording 110 based on the time of the interaction. The positive weight adjustment and the negative weight adjustment may be each a fixed consonant (e.g., multiplicative factor greater than or less than 1) or a range of values depending the time of the interactions. In some implementations, the video selector 226 can identify whether the identified time of interaction belongs in the positive range of times or the negative range of times. The positive weight adjustment to the one or more weights of the aggregate performance model may result a higher probability that the respective recording 110 of the execution of the application 238 is selected in response to future requests for downloading the application 238. The negative weight adjustment to the one or more weights of the aggregate performance model may result a lower probability that the respective recording 110 of the execution of the application 238 is selected in response to future requests for downloading the application 238. If the time of the interaction is identified as belonging to the positive range, the video selector 226 can increment, modify, or otherwise adjust the one or more weights of the aggregate performance model by the positive weight adjustment. If the time of the interaction is identified as belonging to the negative range, the video selector 226 can increment, modify, or otherwise adjust the one or more weights of the aggregate performance model by the negative weight adjustment.

In some implementations, the video selector 226 can calculate, adjust, or otherwise update the one or more weights of the aggregate performance model for the recording 110 of the execution of the application based on a plurality of times of the interactions. In some implementations, the video selector 226 can identify the plurality of times of the interactions. In some implementations, the video selector 226 can determine or calculate a density of the plurality of times of the interactions. In some implementations, the video selector 226 can determine whether the density of the plurality of times of the interactions is greater than or equal to a threshold density. If the video selector 226 determines that the density is greater than or equal to the threshold density, the video selector 226 can adjust the he one or more weights of the aggregate performance model by the positive weight adjustment. If the video selector 226 determines that the density is less than the threshold density, the video selector 226 can adjust he one or more weights of the aggregate performance model by the negative weight adjustment.

The video selector 226 can truncate the recording 110 of the execution of the application 238. The video selector 226 can set the time length of the recording 110 of the execution of the application 238 based on the start time and the end time. In some implementations, the video selector 226 can determine the start time and the end time based on the interactions recorded in the interaction log for the recording. In some implementations, from the interaction log for the recording 110 of the application 238, the video selector 226 can identify a first time of the interaction and a last time of the interaction. In some implementations, the video selector 226 can set the first time of the interaction to the start time of the recording 110 and the last time of the interaction to the end time of the recording. In some implementations, the video selector 226 can determine an average first time and an average last time from interaction logs for the recording 110 from a plurality of client devices 105. In some implementations, the video selector 226 can set the average first time of the interactions to the start time of the recording 110 and the average end time of the interactions to the end time of the recording. In some implementations, from the interaction log for the recording 110 of the application 238, the video selector 226 can determine a density or a rolling average over various time windows of the times of the interactions with the application 238. In some implementations, the video selector 226 can identify a range of times in which the density or rolling average is the highest. In some implementations, the video selector 226 can determine the start time and the end time based on the identified range of times corresponding to the highest density or rolling average.

In some implementations, responsive to receiving interaction logs for the recording, the video selector 226 can determine a start time and an end time for the corresponding recording 110 based on the respective performance metric or the aggregate performance model. In some implementations, while iterating through the interactions of each interaction log for the recording 110 and updating the performance metric, the video selector 226 can identify an initial time at which the performance metric is updated by the positive weight adjustment and a subsequent time at which the performance metric is updated by the negative weight adjustment. In some implementations, while iterating through the interactions of each interaction log for the recording 110 and updating the aggregate performance model, the video selector 226 can identify an initial time at which the one or more weights of the aggregate performance model is updated by the positive weight adjustment and a subsequent time at which the one or more weights of the aggregate performance model is updated by the negative weight adjustment. Using the identified initial time and subsequent time, the video selector 226 can set the start time of the recording 110 to the identified initial time and the end time of the recording 110 to the identified subsequent time. In some implementations, the video selector 226 can apply an offset to the identified initial time and the subsequent time prior to setting the start time and the end time for the recording 110 of the execution of the application 238.

Afterwards, for the third set of client devices 105", the application distributor 218 can provide, distribute, or otherwise transmit the application 238 and the player script 244 to play the selected recording 110. If the recording aggregator 222 determines that the number of times played for the recordings 110 of the execution of the application 238 is greater than or equal to the threshold number of times, the video selector 226 can select one of the recordings 110 for the application 238. In some implementations, the video selector 226 can rank the recordings 110 for the application 238 by the performance metrics. In some implementations, the video selector 226 can identify the recording for the application 238 with the highest performance metric. In some implementations, the video selector 226 can generate the performance metric from the one or more weights of the aggregate performance model for each of the recordings 110 of the execution of the application 238, responsive to receiving the request to download the application 238. In some implementations, the application distributor 218, in conjunction with the video selector 226, can transmit the application 238, the player script 244 for playing the selected recording 110, and the selected video 110. In some implementations, the application distributor 218, in conjunction with the video selector 226, can transmit the application 238 and the selected video 110.

The client device 105 can receive the application 238, the selected recording 110, and the player script 244 from the application distributor 218 via the network 205. In some implementations, the client device 105 can receive the application 238 and the selected recording 110 from the application distributor 218 via the network 205. In some implementations, there may already be another application (e.g., media player, web browser, etc.) for playing the selected recording 110 at the client device 105. Upon receipt, the client device 105 can store or install the application 238 and the player script 244 onto the memory 236. In some implementations, receipt of the application 238 and the player script 244 can cause or trigger the client device 105 to perform functionalities specified in the application 238 or the player script 244. In some implementations, the player script 244 can play the recording 110. In some implementations, receipt of the selected recording 110 can cause or trigger the client device 105 to play the recording 110 using a pre-installed application (e.g., previously installed media player or web browser, etc.). In some implementations client device 105 can play the selected recording 110 using the pre-installed application. Subsequent to playing the recording, the client device 105 can execute the application 238 using the processor 230.

With the exchange of data between the data processing system 210 and the client device 105 (or plurality of client devices 105) in this manner, the system 200 can automatically generate recordings 110 of the application 238 executing on multiple client devices 110 and then select the most appropriate or optimal recording 110 from the recordings 110 to instruct or train a user at the client device 105 to operate the application 238. As such, the system 200 detailed herein may thus reduce the time of execution of an application 238 by training the user to properly use and run the application 238, thereby saving power consumption, network bandwidth, and computer processing time at the client device 105, data processing system 210, and the network 205.

Figure 3A:
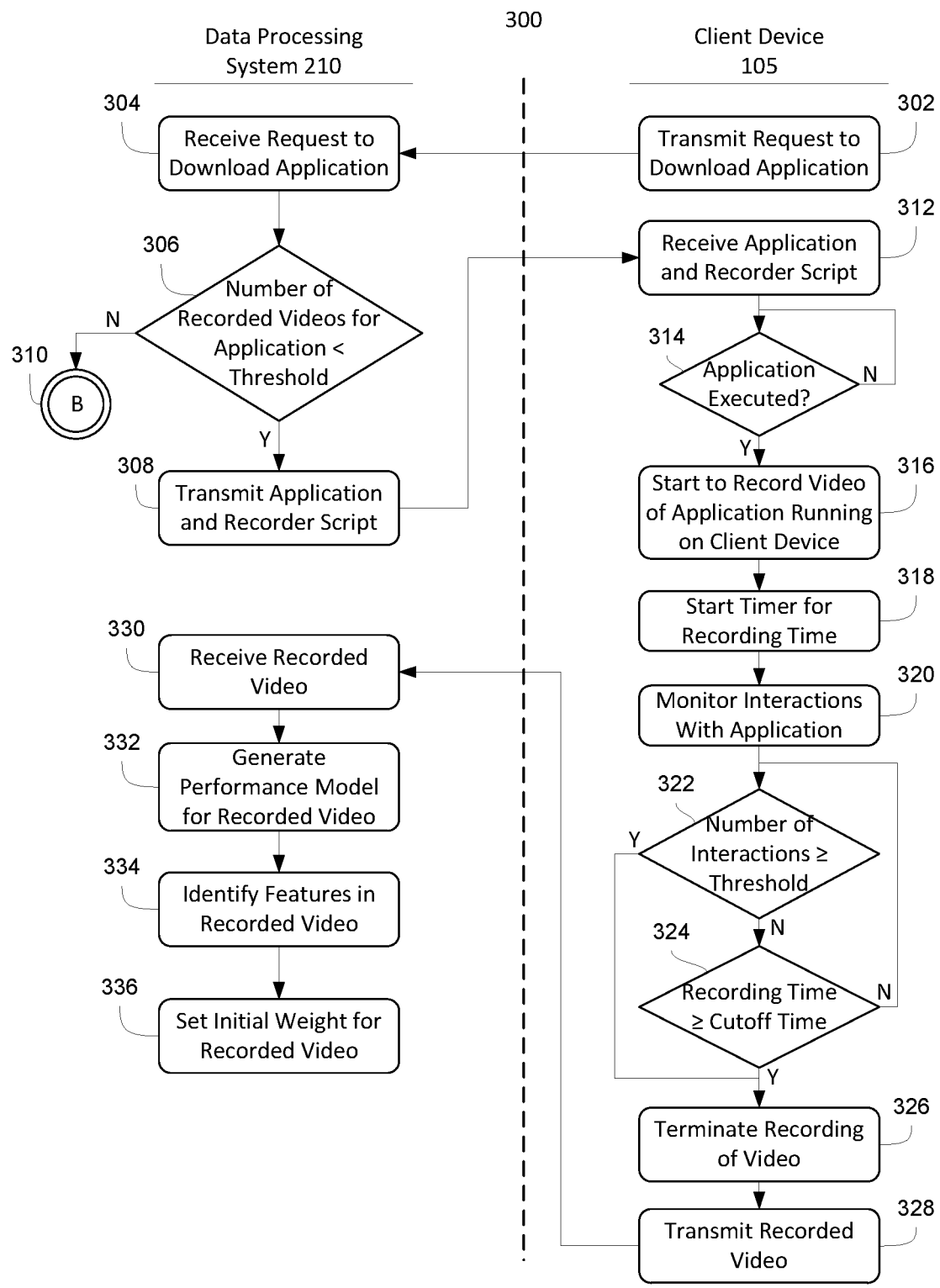
FIGS. 3A-3C are flow diagrams depicting a method of automatically selecting and distributing recordings of applications executing on end user computing devices, according to an illustrative implementation.
Figure 3B:
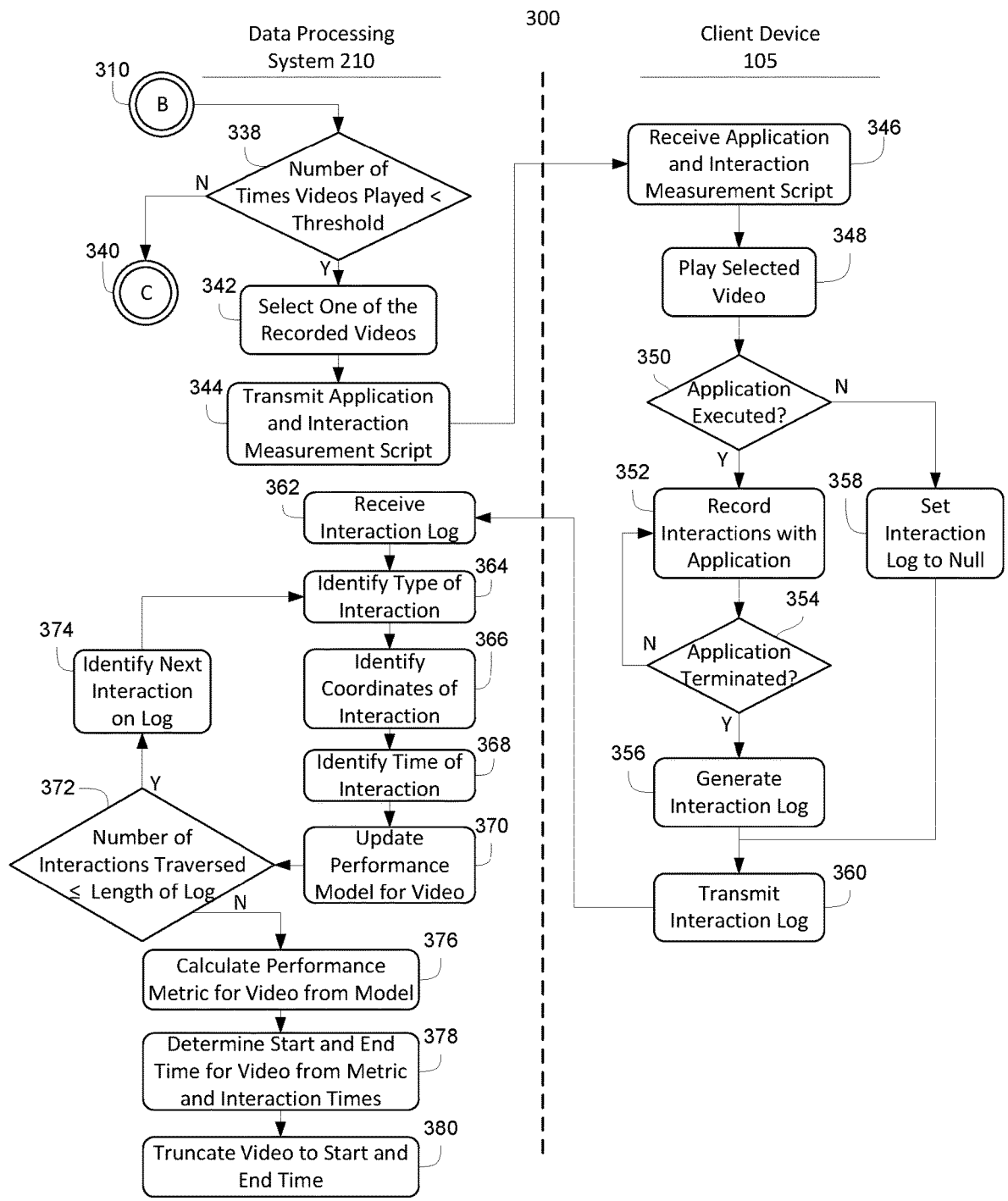
Figure 3C:
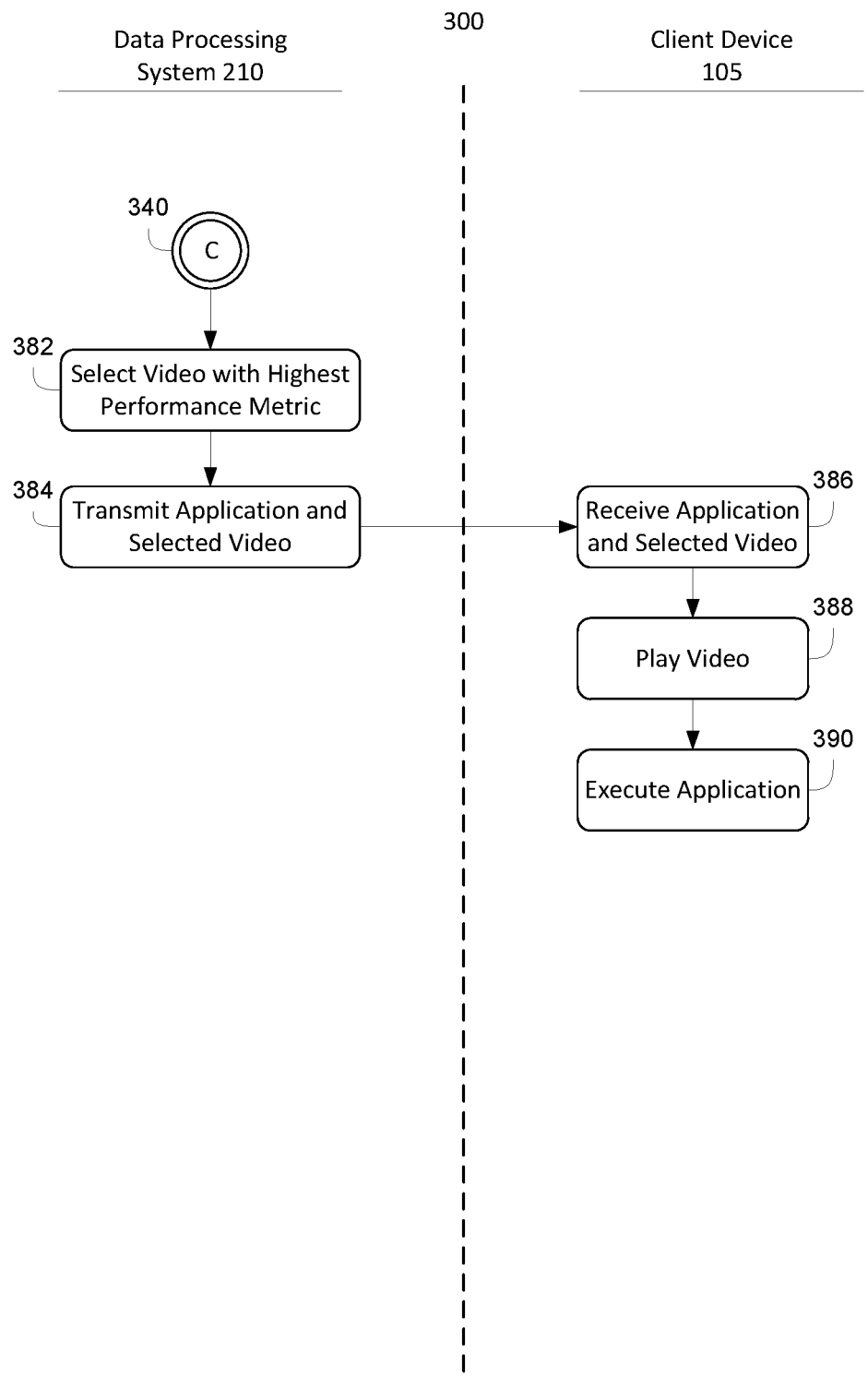
Figure 4:
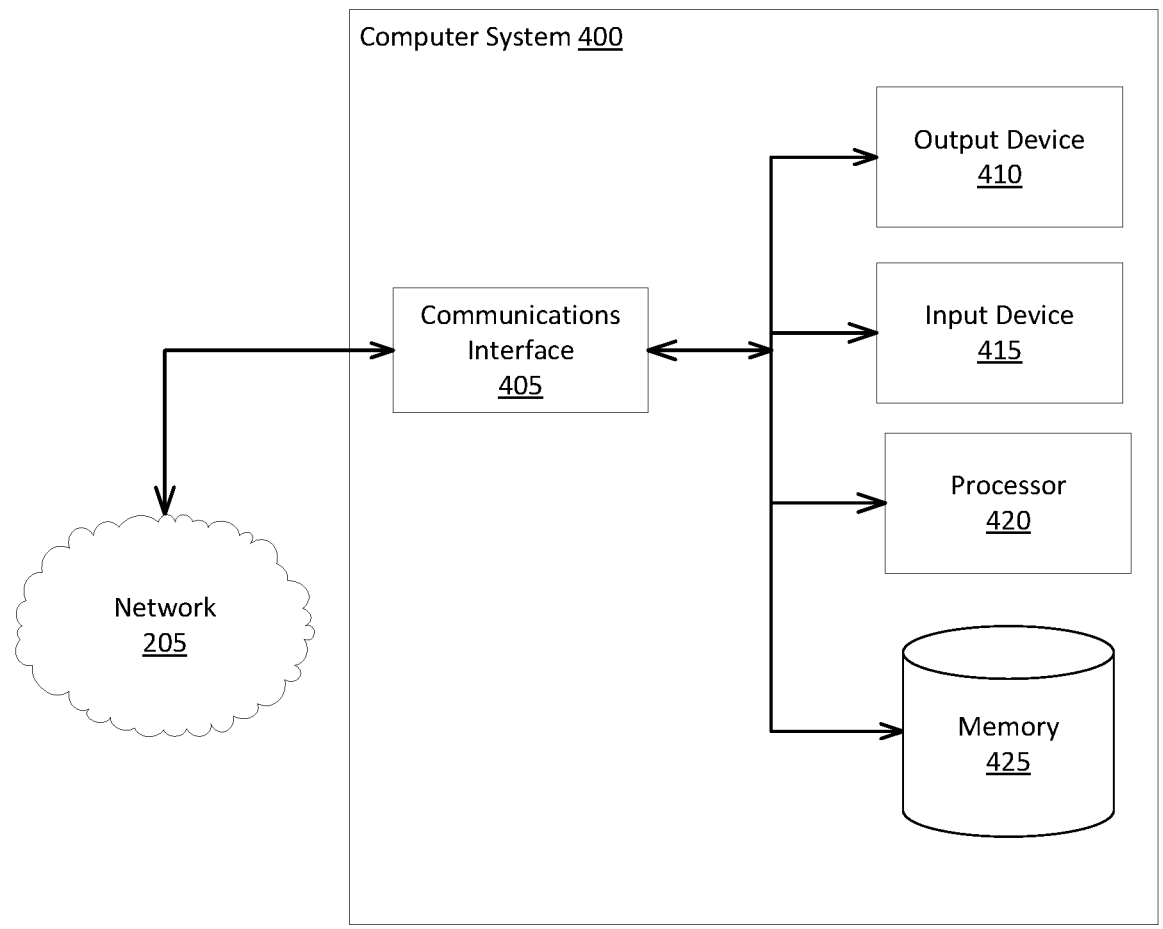
FIG. 4 is a block diagram illustrating a general architecture for a computer system that may be employed to implement elements of the systems and methods described and illustrated herein, according to an illustrative implementation.

FIG. 3A-3C is a flow diagram depicting a method 300 of dynamically modifying properties of content elements within information resources by client-side computing devices, according to an illustrative implementation. The functionality described herein with respect to method 300 can be performed or otherwise executed by the data processing system 210 or client device 105 as shown in FIG. 2, the content render modification system 300 as shown in FIG. 3, or a computing device as shown in FIG. 4, or any combination thereof.

In further detail, the client device 105 can transmit a request to download an application (step 302). The data processing system 210 can receive the request to download the application (step 304). In some implementations, the client device 105 may have not downloaded, installed, or executed the application previously. The request to download the application may be triggered by a program running on the client device 105, such as an application distribution platform listing various applications available for download.

The data processing system 210 can determine whether a number of recorded videos for the application is less than a threshold number of recorded videos (step 306). The threshold may be used by the data processing system 210 to accumulate or aggregate more recordings of the application executing or operating on client devices. If the number of recorded videos is greater than or equal to the threshold number, the method 300 proceeds to stage B 310 (see FIG. 3B). If the number of recorded videos is less than the threshold number, the data processing system 210 can transmit the application and a recorder script (step 308). The client device 105 can receive the application and the recorder script (step 312). The recorder script can cause or trigger the client device 105 to perform functionalities specified in the recorder script.

The client device 105 can determine whether application has executed (step 314). In some implementations, the client device 105 can monitor for instantiations of the application subsequent to installation or storage of the application at the client device 105. If the application has not executed, the client device 105 can continue to monitor for the instantiation of the application. The client device 105 can continue to monitor for the instantiation for a predefined period of time.

If the application has executed, the client device 105 can start recording the video of the application running on the client device 105 (step 316). In some implementations, the client device 105 can start writing a video file in any format on a memory at the client device 105 to record the video. The client device 105 can identify the dimensions (e.g., pixel coordinates and size) of the application running thereon. The recording of the video may be limited to the dimensions of the application.

The client device 105 can start a timer to measure recording time (step 318). In some implementations, the client device 105 can record the execution of the application for a predefined period of time. The predefined period of time may be used to limit a size of the video file to send back to the data processing system 210. The client device 105 can monitor interactions with the application (step 320). In some implementations, the client device 105 can maintain a counter for a number of interactions. The client device 105 can detect interaction (e.g., click, swipe, scroll, keypress, etc.) using event listeners or event handlers. Each time the interaction is detected, the client device 105 can increment the counter.

The client device 105 can determine whether the number of interactions is greater than or equal to a threshold number of interactions (step 322). In some embodiments, the client device 105 can compare the current count on the counter to the threshold number of interactions. The threshold number of interaction may be used to limit the size of the video file to send back to the data processing system 210. If the number of interactions is less than the threshold number of interactions, the client device 105 can determine whether the recording time is greater than or equal to a cutoff time (step 324). In some implementations, the client device 105 can continue to monitor for the number of interactions. If the recording time is greater than or equal to the cutoff time, the client device 105 can terminate recording of the video (step 326). The client device 105 can transmit the recorded video to the data processing system 210 (step 328).

The data processing system 210 can receive the recorded video from the client device 105 (step 330). The data processing system 210 can generate a performance model for the recorded video (step 332). In some implementations, the data processing system 210 can maintain the performance model for the recorded video, using an artificial neural network (ANN), a support vector machine (SVM), deep structural learning model, unsupervised learning models, or supervised learning models, among others. The data processing system 210 can identify features in the recorded video (step 334). In some implementations, the data processing system 210 can use an image recognition algorithm to identify features within the frames of the recorded video. Examples of image recognition algorithms include edge detection algorithms, corner detection algorithms, blob detection algorithms, scene change algorithms, or any other machine learning techniques. The data processing system 210 can set an initial weight in the performance model for the recorded video (step 336).

Moving onto stage B 310, the data processing system 210 can determine whether a number of times the videos were played is less than a threshold number of times (step 338). If the number of times the videos were played is greater than or equal to the threshold number of times, the method 300 can move to stage C 340 (see FIG. 3C). If the number of times the videos were played is greater than or equal to the threshold number of times, the data processing system 210 can select one of the recorded videos (step 342). In some implementations, the data processing system 210 can use the performance metrics for all the recorded videos to identify one video with the highest performance metrics. In another example, the data processing system 210 can select a recorded video at random. The data processing system 210 can transmit the application and an interaction measurement script (step 344).

The client device 105 can receive the application and the interaction measurement script (step 346). The interaction measurement script can trigger or cause the client device 105 to perform functionalities specified on the script. The client device 105 can play the selected video (step 348). The client device 105 can determine whether the application has executed (step 350). If the application has executed, the client device 105 can record interactions with the application (step 352). In some implementations, the client device 105 can monitor for the triggering of event listeners or handlers. Each the trigger is detected, the client device 105 can identify a time, a type, and a coordinate of the interaction. The client device 105 can determine whether application has terminated (step 354). If the application has terminated, the client device 105 can generate the interaction log (step 356). In some implementations, using the identified time, type, and coordinate of the interaction, the client device 105 can write the identified data into the interaction log on storage at the client device 105. If the application has not executed, the client device 105 can set the interaction log to null (step 358). In some implementations, the client device 105 can write an interaction log indicating no interactions with the application. The client device 105 can transmit the interaction log to the data processing system 210 (step 360).

The data processing system 210 can receive the interaction log (step 362). The data processing system 210 can then proceed to traverse through the interactions recorded on the interaction log in steps 364-374 to update the performance metric for the video. The data processing system 210 can identify a type of interaction (step 364). The data processing system 210 can identify coordinates of interaction (step 366). The data processing system 210 can identify a time of interaction (step 368).

Using the identified type of interaction, coordinates of interaction, and the time of interaction, the data processing system 210 can update the performance model for the videos (step 370). In some implementations, the data processing system 210 can identify whether to apply a positive weight adjustment to the performance model to increase a likelihood of selection of the video or to apply a negative weight adjustment to the performance model to decrease the likelihood of selection of the video. The data processing system 210 can determine whether the identified type of interaction, coordinates of interaction, and the time of interaction is of a positive set or range or a negative set or range. The positive set or range may correspond to applying of the positive weight adjustment and the negative set or range may correspond to applying of the negative weight adjustment. Based on the identification, the data processing system 210 can adjust the performance model for the videos.

To determine whether to continue traversing, the data processing system 210 can determine whether a number of interaction traversed is less than or equal to a length of the interaction log (step 372). If the number of interactions traversed is less than or equal to the length of the interaction log, the data processing system 210 can identify a next interaction on the interaction log (step 374). The data processing system 210 repeat the functionality of steps 364-372 for the next identified interaction.

If the number of interactions traversed is greater than the length of the interaction log, the data processing system 210 can calculate the performance metric for the video from the performance model (step 376). In some implementations, the performance metric may be indicative of the effectiveness of the video in instruction an end user how to operate the corresponding application. The data processing system 210 can determine a start time and an end time for video from performance metric and interaction times from the interaction log (step 378). In some implementations, the data processing system 210 can determine a rolling average of number of interactions over a time window, and calculate the start and end times for the video based on at which time window the rolling average is the greatest. The data processing system 210 can truncate the video to the start time and the end time (step 380).

Moving on to stage C 340, the data processing system 210 can select a video with the highest performance metric (step 382). In some implementations, the data processing system 210 can rank the videos by performance metric, and select the video with the highest performance metric. The data processing system 210 can transmit the application and the selected video (step 384). The client device 105 can receive the application and the selected video (step 386). The client device 105 can play the video (step 388). The client device 105 can execute the application (step 390).

FIG. 4 shows the general architecture of an illustrative computer system 400 that may be employed to implement any of the computer systems discussed herein (including the system 210 and its components such as the application distributor 218, the record aggregator 222, and video selector 226 or the application 238 and its modules, the recorder script 240, the player script 244, and interaction measurement script 242 and its components) in accordance with some implementations. The computer system 400 can be used to provide information via the network 205 for display. The computer system 400 of FIG. 4 comprises one or more processors 420 communicatively coupled to memory 425, one or more communications interfaces 405, and one or more output devices 410 (e.g., one or more display units) and one or more input devices 415. The processors 420 can be included in the data processing system 210 or the other components of the system 210 such as the application distributor 218, the record aggregator 222, and the video selector 226. The processors can be included in the client device 105 or their modules, such as the application 238, the recorder script 240, interaction measurement script 242, and the player script 244.

In the computer system 400 of FIG. 4, the memory 425 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 210 of FIG. 1, the data processing system 210 can include the memory 425 to store information related to the availability of inventory of one or more content units, reservations of one or more content units, among others. The memory 425 can include the database 245. The processor(s) 420 shown in FIG. 4 may be used to execute instructions stored in the memory 425 and, in so doing, also may read from or write to the memory various information processed and or generated pursuant to execution of the instructions.

The processor 420 of the computer system 400 shown in FIG. 4 also may be communicatively coupled to or control the communications interface(s) 405 to transmit or receive various information pursuant to execution of instructions. In some implementations, the communications interface(s) 405 may be coupled to a wired or wireless network, bus, or other communication means and may therefore allow the computer system 400 to transmit information to or receive information from other devices (e.g., other computer systems). While not shown explicitly in the system of FIG. 1, one or more communications interfaces facilitate information flow between the components of the system 400. In some implementations, the communications interface(s) may be configured (e.g., via various hardware components or software components) to provide a website as an access portal to at least some aspects of the computer system 400. Examples of communications interfaces 405 include user interfaces (e.g., web pages), through which the user can communicate with the data processing system 210.

The output devices 410 of the computer system 400 shown in FIG. 4 may be provided, to allow various information to be viewed or otherwise perceived in connection with execution of the instructions. The input device(s) 415 may be provided, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The application distributor 218, the application database 220, the record aggregator 222, recorded videos database 240, the video selector 226, and the interaction log database 228 can include or share one or more data processing apparatuses, computing devices, or processors. The application 238, the recorder script 240, the interaction measurement script 242, and the player script 244 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system such as system 400 or system 210 can include clients and servers. In some implementations, the data processing system 210 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. In some implementations, the application distributor 218, the application database 220, the record aggregator 222, the recorded videos database 240, the video selector 226, and the interaction log database 228 can be part of the data processing system 210, a single module, a logic device having one or more processing modules, one or more servers, or part of a search engine. In addition, the application 238, the recorder script 240, and the interaction measurement script 242, and the player script 244 can include or can be part of the client device 105, a single module, or a logic device having one or more processing module.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to attributing a scroll event on an application, the systems and methods described herein can include applied to other environments. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method for automatically selecting and distributing recordings of applications executing on end user computing devices, comprising:
   receiving, by a data processing system, from each of a plurality of first client devices, a first request to download an application;
   determining, by the data processing system, that a number of recordings of execution of the application is below a threshold, responsive to receiving the first request;
   transmitting, by the data processing system to each of the plurality of first client devices, responsive to the determination that the number of recordings is below the threshold, the application and a recorder script to generate a recording of an execution of the application running on a corresponding client device of the plurality of first client devices and to provide to the data processing system;
   generating, by the data processing system, for each recording of the execution of the application received from the corresponding client device of the plurality of first client devices, a performance metric based on one or more interaction events with the application on the corresponding client device;
   maintaining, by the data processing system, a plurality of recordings using the recording of the application executing on the corresponding client device of the plurality of first client devices and a plurality of performance metrics generated for the corresponding plurality of first client devices;
   receiving, by the data processing system, from a second client device, a second request to download the application, subsequent to receiving the recording of the application from the corresponding client device of the plurality of first client devices;
   determining, by the data processing system, that the number corresponding to the plurality of recordings of execution of the application is greater than the threshold;
   selecting, by the data processing system, responsive to the determination that the number of recordings is greater than the threshold, a recording from the plurality of records based on the performance metric of the recording; and
   transmitting, by the data processing system, to the second client device, the recording selected from the plurality of recordings of the application.

2. The method of claim 1, wherein transmitting the recording of the application executing on a first client device to the second client device further comprises transmitting an interaction measurement script, receipt of the interaction measurement script triggering the second client device to:
   play the recording of the application executing on the first client device,
   generate an interaction log of one or more interaction events with the application running on the second client device, subsequent to playing the recording, and
   transmit the generated interaction log to the data processing system; and
   receiving, by the data processing system, from the second client device, the generated interaction log; and
   generating, by the data processing system, the performance metric for the recording of the application based on the one or more interaction events identified in the generated interaction log.

3. The method of claim 2, further comprising:
   receiving, by the data processing system, from a third client device, a third request to download the application;
   selecting, by the data processing system, responsive to receiving the third request to download the application, the recording of the application executing on the first client device based on the performance metric for the recording of the application executing on the first client device exceeding a second performance metric for a recording of the application running on the second client device; and
   transmitting, by the data processing system, to the third client device, the application and a player script, receipt of the player script triggering the third client device to play the recording of the application executing on the first client device.

4. The method of claim 3, wherein generating the performance metric further comprises:
identifying a number of times played for the recording of the application at a plurality of client devices;
determining that the number of times played for the recording of the application is above a second threshold; and
calculating, responsive to determining that the number of times played for the recording of the application is above the second threshold, the performance metric based on the one or more interaction events identified in the generated interaction log received from the second client device.

5. The method of claim 3, wherein generating the performance metric further comprises:
maintaining an aggregate performance model for a plurality of recordings of execution of the application on a plurality of client devices;
assigning an initial value to a weight in the aggregate performance model for the recording of execution of the application on the first client device, responsive to receiving the recording from the first client device; and
adjusting the weight from the initial value to a second value in the aggregate performance model, responsive to receiving the generated interaction log of the one or more interaction events from the second client device.

6. The method of claim 3, further comprising:
determining, by the data processing system, a start time and an end time for the recording of execution of the application on the first client device based on the performance metric and the one or more interaction events on the application by the second client device;
setting, by the data processing system, a time length of the recording of execution of the application on the first client device based on the start time and the end time; and
wherein transmitting the application and the player script to the third client device further comprises transmitting the recording with the time length set to the start time and the end time.

7. The method of claim 2, further comprising:
identifying, by the data processing system, responsive to receiving the first request to download the application, a number of times the application has been downloaded by the first client device;
determining, by the data processing system, that the number of times the application has been downloaded by the first client device is equal to zero; and
wherein transmitting the recorder script to the first client device further comprises transmitting the recorder script to the first client device, responsive to determining that the number of times the application has been downloaded by the first client device is equal to zero.

8. The method of claim 2, wherein transmitting the application and the recorder script to the first client device further comprises transmitting the application and the recorder script to the first client device, receipt of the recorder script triggering the first client device to record one or more second interaction events with the application and to transmit the one or more second interaction events to the data processing system; and further comprising:
generating, by the data processing system, the recording based on the application and the one or more second interaction events with the application on the first client device.

9. The method of claim 2, wherein transmitting the application and the recorder script to the first client device further comprises transmitting the application and the recorder script to the first client device, receipt of the recorder script triggering the first client device to:
determine that the application is executing on the first client device,
initialize recording of execution of the application, responsive to determining that the application is executing on the first client device, and
record output of the application executing on the first client device for a predefined time.

10. The method of claim 2, wherein transmitting the application and the recorder script to the first client device further comprises transmitting the application and the recorder script to the first client device, receipt of the recorder script triggering the first client device to:
monitor one or more second interaction events with the application on the first client device,
determine that a number of one or more second interaction events exceeds a predetermined number of events, and
terminate recording of execution of the application running on the first client device, responsive to determining that the number of the one or more second interaction events exceeds the predetermined number of events.

11. A system for automatically selecting and distributing recordings of applications executing on end user computing devices, comprising:
a data processing system having one or more processors coupled with memory, configured to:
receive, from each of a plurality of first client devices, a first request to download an application; and
determine that a number of recordings of execution of the application stored in the memory is below a threshold, responsive to the receipt of the first request;
transmit, responsive to the determination that the number of recordings is below the threshold, to each of the plurality of first client devices, the application and a recorder script to generate a recording of an execution of the application running on a corresponding client device of the plurality of first client devices and to provide to the data processing system;
generate, for each recording of the execution of the application received from the corresponding client device of the plurality of first client devices, a performance metric based on one or more interaction events with the application on the corresponding client device;
maintain a plurality of recordings using the recording of the application executing on the corresponding client device of the plurality of first client devices and a plurality of performance metrics generated for the corresponding plurality of first client devices;
receive, from a second client device, a second request to download the application, subsequent to receiving the recording of the application from the corresponding client device of the plurality of first client devices;

determine that the number corresponding to the plurality of recordings of execution of the application is greater than the threshold;

select, responsive to the determination that the number of recordings is greater than the threshold, a recording from the plurality of records based on the performance metric of the recording; and transmit, to the second client device, the recording selected from the plurality of recordings of the application.

12. The system of claim 11, wherein the data processing system is further configured to transmit an interaction measurement script, receipt of the interaction measurement script triggering the second client device to:

play the recording of the application executing on a first client device, generate an interaction log of one or more interaction events with the application running on the second client device, subsequent to playing the recording, and transmit the generated interaction log to the data processing system; and wherein the data processing system is further configured to receive, from the second client device, the generated interaction log and to generate performance metric for the recording of the application based on the one or more interaction events identified in the generated interaction log.

13. The system of claim 12, wherein the data processing system is further configured to:

receive, from a third client device, a third request to download the application;

select, responsive to the receipt of the third request to download the application, the recording of the application executing on the first client device based on the performance metric for the recording of the application executing on the first client device exceeding a second performance metric for a recording of the application running on the second client device; and transmit, to the third client device, the application and a player script, receipt of the player script triggering the third client device to play the recording of the application executing on the first client device.

14. The system of claim 12, wherein the data processing system is further configured to:

identify a number of times played for the recording of the application at a plurality of client devices;

determine that the number of times played for the recording of the application is above a second threshold; and calculate, responsive to the determination that the number of times played for the recording of the application is above the second threshold, the performance metric based on the one or more interaction events identified in the generated interaction log received from the second client device.

15. The system of claim 12, wherein the data processing system is further configured to:

identify an event type for each of the one or more interaction events identified in the generated interaction log received from the second client device; and generate the performance metric based on the event type of each of the one or more interaction events.

16. The system of claim 12, wherein the data processing system is further configured to:

maintain an aggregate performance model for a plurality of recordings of execution of the application on a plurality of client devices;

assign an initial value to a weight in the aggregate performance model for the recording of execution of the application on the first client device, responsive to receiving the recording from the first client device; and adjust the weight from the initial value to a second value in the aggregate performance model, responsive to receiving the generated interaction log of the one or more interaction events from the second client device.

17. The system of claim 12, wherein the data processing system is further configured to:

determine a start time and an end time for the recording of execution of the application on the first client device based on the performance metric and the one or more interaction events on the application by the second client device;

set a time length of the recording of execution of the application on the first client device based on the start time and the end time; and transmit the recording with the time length set to the start time and the end time.

18. The system of claim 12, wherein the data processing system is further configured to:

transmit the application and the recorder script to the first client device, receipt of the recorder script triggering the first client device to record one or more second interaction events with the application and to transmit the one or more second interaction events to the data processing system; and generate the recording based on the application and the one or more second interaction events with the application on the first client device.

19. The system of claim 12, wherein the data processing system is further configured to transmit the application and the recorder script to the first client device, receipt of the recorder script triggering the first client device to:

monitor one or more second interaction events with the application on the first client device, determine that a number of one or more second interaction events exceeds a predetermined number of events, and terminate recording of execution of the application running on the first client device, responsive to determining that the number of the one or more second interaction events exceeds the predetermined number of events.

* * * * *